(12) United States Patent
Kent

(10) Patent No.: US 10,757,308 B2
(45) Date of Patent: Aug. 25, 2020

(54) TECHNIQUES FOR DEVICE ATTACHMENT WITH DUAL BAND IMAGING SENSOR

(71) Applicant: FLIR Systems, Inc., Wilsonville, OR (US)

(72) Inventor: Michael Kent, Goleta, CA (US)

(73) Assignee: FLIR SYSTEMS, INC., Wilsonville, OR (US)

( * ) Notice: Subject to any disclaimer, the term of this patent is extended or adjusted under 35 U.S.C. 154(b) by 127 days.

(21) Appl. No.: 15/199,861

(22) Filed: Jun. 30, 2016

(65) Prior Publication Data

US 2016/0316119 A1   Oct. 27, 2016

Related U.S. Application Data

(63) Continuation of application No. PCT/US2014/073098, filed on Dec. 31, 2014.
(Continued)

(51) Int. Cl.
*H04N 5/33* (2006.01)
*H04N 5/225* (2006.01)
(Continued)

(52) U.S. Cl.
CPC ............ *H04N 5/2257* (2013.01); *G01J 5/025* (2013.01); *G01J 5/0205* (2013.01); *G01J 5/0265* (2013.01); *G01J 5/04* (2013.01); *G01J 5/048* (2013.01); *G01J 5/089* (2013.01); *G01J 5/0831* (2013.01); *G01J 5/0834* (2013.01); *G01J 5/0843* (2013.01);
(Continued)

(58) Field of Classification Search
CPC ............ G03B 2205/0092; G03B 35/08; H04N 5/2254; H04N 5/33; H04N 5/2257; H04N 5/2253; H04N 5/23296; H04N 5/3651; H04N 5/2252; H04N 5/2258; H04N 1/2137; H04N 5/2251; H04N 5/232;
(Continued)

(56) References Cited

U.S. PATENT DOCUMENTS 2,764,055 A    9/1956 Clemens et al.
4,544,249 A *  10/1985 Maemori ............... G03B 19/07
                                          396/73
(Continued)

FOREIGN PATENT DOCUMENTS

CA    2764055    7/2012
CN    2874947    2/2007
(Continued)

OTHER PUBLICATIONS

Frank et al. "Mobile Communications Device Attachment with Camera" U.S. Appl. No. 29/423,027, filed May, 25, 2012, 6 pgs.
(Continued)

*Primary Examiner* — Masum Billah
(74) *Attorney, Agent, or Firm* — Haynes and Boone, LLP

(57) ABSTRACT

Various techniques are disclosed for providing a device attachment configured to releasably attach to and provide infrared imaging functionality to mobile phones or other portable electronic devices. The device attachment may include an infrared imagining module and a non-thermal imaging module that cooperate with one or more of a non-thermal imaging module in an attached device and a light source in the attached device for capturing and processing images.

20 Claims, 21 Drawing Sheets

Related U.S. Application Data

(60) Provisional application No. 61/923,742, filed on Jan. 5, 2014.

(51) Int. Cl.
*G01J 5/08* (2006.01)
*G01J 5/02* (2006.01)
*G01J 5/04* (2006.01)
*G01J 5/52* (2006.01)
*G01J 5/00* (2006.01)

(52) U.S. Cl.
CPC .......... *G01J 5/0846* (2013.01); *G01J 5/0859* (2013.01); *G01J 5/0893* (2013.01); *G01J 5/0896* (2013.01); *G01J 5/522* (2013.01); *H04N 5/2252* (2013.01); *H04N 5/332* (2013.01); *G01J 2005/0048* (2013.01); *G01J 2005/0077* (2013.01)

(58) Field of Classification Search
CPC .......... H04N 5/23212; H04N 5/23248; H04N 5/23287; H04N 5/332; H04N 2007/145
USPC ........................................................ 348/164
See application file for complete search history.

(56) References Cited

U.S. PATENT DOCUMENTS

| | | | |
|---|---|---|---|
| 4,754,139 A | 6/1988 | Ennulat et al. | |
| 5,128,796 A | 7/1992 | Barney et al. | |
| 6,081,331 A | 6/2000 | Teichmann | |
| 6,297,794 B1 | 10/2001 | Tsubouchi et al. | |
| 6,330,371 B1 | 12/2001 | Chen et al. | |
| 6,348,951 B1 | 2/2002 | Kim | |
| 6,396,543 B1 | 5/2002 | Shin et al. | |
| 6,424,843 B1 | 7/2002 | Reitmaa et al. | |
| 6,633,231 B1 | 10/2003 | Okamoto et al. | |
| 6,681,120 B1 | 1/2004 | Kim | |
| 6,707,044 B2 | 3/2004 | Lannestedt et al. | |
| 6,759,949 B2 | 7/2004 | Miyahara | |
| 6,883,054 B2 | 4/2005 | Yamaguchi et al. | |
| 6,911,652 B2 | 6/2005 | Walkenstein | |
| 6,995,359 B1 | 2/2006 | Hillenbrand et al. | |
| 7,050,107 B1 | 5/2006 | Frank et al. | |
| D524,785 S | 7/2006 | Huang | |
| 7,084,857 B2 | 8/2006 | Lieberman et al. | |
| 7,208,733 B2 | 4/2007 | Mian et al. | |
| 7,263,379 B1 | 8/2007 | Parkulo et al. | |
| 7,284,921 B2 | 10/2007 | Lapstun et al. | |
| 7,296,747 B2 | 11/2007 | Rohs | |
| 7,305,368 B2 | 12/2007 | Lieberman et al. | |
| 7,321,783 B2 | 1/2008 | Kim | |
| 7,333,832 B2 | 2/2008 | Tsai et al. | |
| 7,377,835 B2 | 5/2008 | Parkulo et al. | |
| 7,420,663 B2 | 9/2008 | Wang et al. | |
| 7,453,064 B2 | 11/2008 | Lee | |
| 7,470,902 B1 | 12/2008 | Kraemer et al. | |
| 7,477,309 B2 | 1/2009 | Cuccias | |
| 7,567,818 B2 | 7/2009 | Pylkko | |
| 7,572,077 B2 | 8/2009 | Lapstun et al. | |
| 7,575,077 B2 | 8/2009 | Priepke et al. | |
| 7,579,592 B2 | 8/2009 | Kaushal | |
| 7,595,904 B2 | 9/2009 | Lapstun et al. | |
| 7,616,877 B2 | 11/2009 | Zarnowski et al. | |
| 7,620,265 B1 | 11/2009 | Wolff et al. | |
| 7,627,364 B2 | 12/2009 | Sato | |
| 7,697,962 B2 | 4/2010 | Cradick et al. | |
| 7,723,686 B2 | 5/2010 | Hannebauer | |
| 7,725,141 B2 | 5/2010 | Su | |
| 7,728,281 B2 | 6/2010 | Chen | |
| 7,735,974 B2 | 6/2010 | Silverbrook et al. | |
| 7,747,454 B2 | 6/2010 | Bartfeld et al. | |
| 7,760,919 B2 | 7/2010 | Namgoong | |
| 7,761,114 B2 | 7/2010 | Silverbrook et al. | |
| 7,773,870 B2 | 8/2010 | Naruse | |
| 7,801,733 B2 | 9/2010 | Lee et al. | |
| 7,810,733 B2 | 10/2010 | Silverbrook et al. | |
| 7,872,574 B2 | 1/2011 | Betts et al. | |
| 7,900,842 B2 | 3/2011 | Silverbrook et al. | |
| 7,903,152 B2 | 3/2011 | Kim | |
| 7,947,222 B2 | 5/2011 | Bae et al. | |
| 7,960,700 B2 | 6/2011 | Craig et al. | |
| 8,049,163 B1 | 11/2011 | Granneman et al. | |
| 8,153,980 B1 | 4/2012 | Brady et al. | |
| 8,208,026 B2 | 6/2012 | Hogasten et al. | |
| 8,274,050 B2 | 9/2012 | Grimberg | |
| 8,275,413 B1 | 9/2012 | Fraden et al. | |
| 8,305,577 B2 | 11/2012 | Kivioja et al. | |
| 8,345,226 B2 | 1/2013 | Zhang | |
| 8,373,757 B1 | 2/2013 | Nguyen | |
| 8,520,970 B2 | 8/2013 | Strandemar | |
| 8,537,343 B2 | 9/2013 | Zhang | |
| 8,565,547 B2 | 10/2013 | Strandemar | |
| 8,749,635 B2 | 6/2014 | Hogasten et al. | |
| 8,780,208 B2 | 7/2014 | Hogasten et al. | |
| 8,781,420 B2 | 7/2014 | Schlub et al. | |
| 8,825,112 B1 | 9/2014 | Fraden et al. | |
| 9,171,361 B2 | 10/2015 | Strandemar | |
| 9,235,876 B2 | 1/2016 | Hogasten et al. | |
| 9,237,284 B2 | 1/2016 | Hogasten et al. | |
| 2002/0006337 A1 | 1/2002 | Kimura et al. | |
| 2002/0058352 A1 | 5/2002 | Jacksen et al. | |
| 2002/0122036 A1 | 9/2002 | Sasaki | |
| 2002/0135571 A1 | 9/2002 | Klocek et al. | |
| 2002/0140542 A1 | 10/2002 | Prokoski et al. | |
| 2002/0149600 A1 | 10/2002 | Van Splunter et al. | |
| 2003/0007193 A1 | 1/2003 | Sato et al. | |
| 2003/0112871 A1 | 6/2003 | Demos | |
| 2003/0122957 A1 | 7/2003 | Emme | |
| 2003/0223623 A1 | 12/2003 | Gutta et al. | |
| 2004/0041935 A1 | 3/2004 | Nagamine et al. | |
| 2004/0047518 A1 | 3/2004 | Tiana | |
| 2004/0067053 A1* | 4/2004 | Litzenberger | G03B 17/04 396/448 |
| 2004/0101298 A1 | 5/2004 | Mandelbaum et al. | |
| 2004/0127156 A1 | 7/2004 | Park | |
| 2004/0128070 A1 | 7/2004 | Schmidt et al. | |
| 2004/0151229 A1 | 8/2004 | Ruettiger | |
| 2004/0157612 A1 | 8/2004 | Kim | |
| 2004/0165788 A1 | 8/2004 | Perez et al. | |
| 2004/0169860 A1 | 9/2004 | Jung et al. | |
| 2004/0207036 A1 | 10/2004 | Ikeda | |
| 2004/0211907 A1 | 10/2004 | Wellman et al. | |
| 2004/0256561 A1 | 12/2004 | Beuhler et al. | |
| 2005/0030314 A1 | 2/2005 | Dawson | |
| 2005/0067852 A1 | 3/2005 | Jeong | |
| 2005/0089241 A1 | 4/2005 | Kawanishi et al. | |
| 2005/0068333 A1 | 5/2005 | Nakahashi et al. | |
| 2005/0093890 A1 | 5/2005 | Baudisch | |
| 2005/0110803 A1 | 5/2005 | Sugimura | |
| 2005/0138569 A1 | 6/2005 | Baxter et al. | |
| 2005/0169655 A1 | 8/2005 | Koyama et al. | |
| 2005/0184993 A1 | 8/2005 | Ludwin et al. | |
| 2005/0213813 A1 | 9/2005 | Lin et al. | |
| 2005/0213853 A1 | 9/2005 | Maier et al. | |
| 2005/0219249 A1 | 10/2005 | Xie et al. | |
| 2005/0248912 A1 | 11/2005 | Kang et al. | |
| 2005/0265688 A1 | 12/2005 | Kobayashi | |
| 2005/0270784 A1 | 12/2005 | Hahn et al. | |
| 2005/0277447 A1 | 12/2005 | Buil et al. | |
| 2006/0039686 A1 | 2/2006 | Soh et al. | |
| 2006/0040478 A1 | 2/2006 | Merkl et al. | |
| 2006/0045504 A1 | 3/2006 | Zarnowski et al. | |
| 2006/0056838 A1* | 3/2006 | Chen | G03B 17/02 396/448 |
| 2006/0060984 A1 | 3/2006 | Wakabayashi et al. | |
| 2006/0077246 A1 | 4/2006 | Kawakami et al. | |
| 2006/0081777 A1 | 4/2006 | Bevan et al. | |
| 2006/0097172 A1 | 5/2006 | Park | |
| 2006/0120712 A1 | 6/2006 | Kim | |
| 2006/0132642 A1 | 6/2006 | Hosaka et al. | |
| 2006/0140501 A1 | 6/2006 | Tadas | |
| 2006/0147191 A1 | 7/2006 | Kim | |

(56) References Cited

U.S. PATENT DOCUMENTS

| | | |
|---|---|---|
| 2006/0154559 A1 | 7/2006 | Yoshida |
| 2006/0210249 A1 | 9/2006 | Seto |
| 2006/0234744 A1 | 10/2006 | Sung et al. |
| 2006/0240867 A1 | 10/2006 | Wang et al. |
| 2006/0279758 A1 | 12/2006 | Myoki |
| 2006/0285907 A1 | 12/2006 | Kang et al. |
| 2007/0004449 A1 | 1/2007 | Sham |
| 2007/0019077 A1 | 1/2007 | Park |
| 2007/0019099 A1 | 1/2007 | Lieberman et al. |
| 2007/0019103 A1 | 1/2007 | Lieberman et al. |
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0248284 A1 | 10/2007 | Bernsen et al. |
| 2007/0263996 A1* | 11/2007 | Iwasaki ............... G02B 27/646 396/55 |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0078590 A1* | 4/2008 | Sequine ............... G06F 3/03548 178/18.06 |
| 2008/0079834 A1 | 4/2008 | Chung et al. |
| 2008/0112012 A1 | 5/2008 | Yokoyama et al. |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0218474 A1 | 9/2008 | Ahn et al. |
| 2008/0218611 A1* | 9/2008 | Parulski ............... H04N 5/2258 348/262 |
| 2008/0248833 A1 | 10/2008 | Silverbrook et al. |
| 2008/0259181 A1 | 10/2008 | Yamashita et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0065695 A1 | 3/2009 | Demarco et al. |
| 2009/0093687 A1 | 4/2009 | Telfort et al. |
| 2009/0129700 A1 | 5/2009 | Rother et al. |
| 2009/0131104 A1 | 5/2009 | Yoon |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2009/0303363 A1 | 12/2009 | Blessinger |
| 2010/0020229 A1 | 1/2010 | Hershey et al. |
| 2010/0021657 A1 | 1/2010 | Lochtman et al. |
| 2010/0066866 A1 | 3/2010 | Lim |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0134604 A1 | 6/2010 | Kieffer et al. |
| 2010/0144387 A1 | 6/2010 | Chou |
| 2010/0163730 A1 | 7/2010 | Schmidt et al. |
| 2010/0219056 A1* | 9/2010 | An ....................... H01H 25/002 200/337 |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0309315 A1 | 12/2010 | Hogasten et al. |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0105100 A1* | 5/2011 | Tanaka ................ H01H 13/702 455/418 |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2011/0221599 A1 | 9/2011 | Högasten |
| 2011/0262125 A1* | 10/2011 | Wang ...................... G03B 9/26 396/448 |
| 2012/0007987 A1 | 1/2012 | Gaber |
| 2012/0013584 A1* | 1/2012 | Senatori ................ G06F 1/1616 345/207 |
| 2012/0083314 A1 | 4/2012 | Ng et al. |
| 2012/0184252 A1 | 7/2012 | Hirsch |
| 2012/0212806 A1 | 8/2012 | Shibata |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0312976 A1 | 12/2012 | Boulanger et al. |
| 2012/0320086 A1 | 12/2012 | Kasama et al. |
| 2013/0141541 A1* | 6/2013 | Jung ..................... G03B 35/08 348/46 |
| 2013/0204570 A1 | 8/2013 | Mendelson et al. |
| 2013/0250047 A1 | 9/2013 | Hollinger |
| 2013/0258111 A1* | 10/2013 | Frank ...................... H04N 5/33 348/164 |
| 2013/0270441 A1 | 10/2013 | Burt et al. |
| 2013/0320220 A1 | 12/2013 | Donowsky |
| 2013/0329054 A1 | 12/2013 | Hoelter et al. |
| 2013/0342691 A1 | 12/2013 | Lewis et al. |
| 2014/0002668 A1 | 1/2014 | Nguyen et al. |
| 2014/0092257 A1 | 4/2014 | Hogasten et al. |
| 2014/0098238 A1 | 4/2014 | Boulanger et al. |
| 2014/0139685 A1 | 5/2014 | Nussmeier et al. |
| 2014/0218520 A1 | 8/2014 | Teich et al. |
| 2014/0240512 A1 | 8/2014 | Hogasten et al. |
| 2014/0253735 A1 | 9/2014 | Fox et al. |
| 2014/0285672 A1 | 9/2014 | Hogasten et al. |
| 2015/0334315 A1 | 11/2015 | Teich et al. |
| 2015/0358560 A1 | 12/2015 | Boulanger et al. |

FOREIGN PATENT DOCUMENTS

| | | |
|---|---|---|
| CN | 2899321 | 5/2007 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| DE | 10 2009 040017 | 3/2011 |
| EP | 0398725 | 11/1990 |
| EP | 0837600 | 4/1998 |

(56) References Cited

FOREIGN PATENT DOCUMENTS

| | | |
|---|---|---|
| EP | 0973137 | 1/2000 |
| EP | 1983485 | 10/2008 |
| EP | 2136554 | 12/2009 |
| EP | 2477391 | 7/2012 |
| JP | 1997275518 | 4/1999 |
| JP | 2001/309003 | 11/2001 |
| JP | 2004/004465 | 1/2004 |
| JP | 2004048571 | 2/2004 |
| JP | 2004/241491 | 8/2004 |
| JP | 2006098098 | 4/2006 |
| JP | 2006105655 | 4/2006 |
| JP | 2007006475 | 1/2007 |
| JP | 2007/267035 | 10/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 20060054877 | 5/2006 |
| KR | 20060071220 | 6/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |

(56) References Cited

FOREIGN PATENT DOCUMENTS

| | | |
|---|---|---|
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 20110006437 | 1/2011 |
| KR | 20110011264 | 2/2011 |
| KR | 2011024290 | 3/2011 |
| KR | 20110019994 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 2000/023814 | 4/2000 |
| WO | WO 03/093963 | 11/2003 |
| WO | WO 2004/027459 | 4/2004 |
| WO | WO 2005/002228 | 1/2005 |
| WO | WO 2005/015143 | 2/2005 |
| WO | WO 2005/088846 | 9/2005 |
| WO | WO 2006/060746 | 6/2006 |
| WO | WO 2006/112866 | 10/2006 |
| WO | WO 2007/006242 | 1/2007 |
| WO | WO 2007/053329 | 5/2007 |
| WO | WO 2008/090345 | 7/2008 |
| WO | WO 2009/122114 | 10/2009 |
| WO | WO 2010/005152 | 1/2010 |
| WO | WO 2010/033142 | 3/2010 |
| WO | WO 2012/149926 | 11/2012 |
| WO | WO 2012/170954 | 12/2012 |
| WO | WO 2014/105241 | 7/2014 |
| WO | WO 2014/105993 | 7/2014 |
| WO | WO 2014/159758 | 10/2014 |

OTHER PUBLICATIONS

Gangkofner et al. "Optimizing the High-Pass Filter Addition Technique for Image Fusion", Photogrammetric Engineering & Remote Sensing, vol. 74, No. 9, Sep. 1, 2008, pp. 1107-1118, XP9150814.
Ager et al. "Geo-Positional Accuracy Evaluation of QuickBird Ortho-Ready Standard 2A Multispectral Imagery", Algorithms and Technologies for Multispectral, Hyperspectral , and Ultraspectral Imagery X, vol. 5425, Aug. 12, 2004, pp. 488-499, XP040185047, Bellingham, WA.
Darpa, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

\* cited by examiner

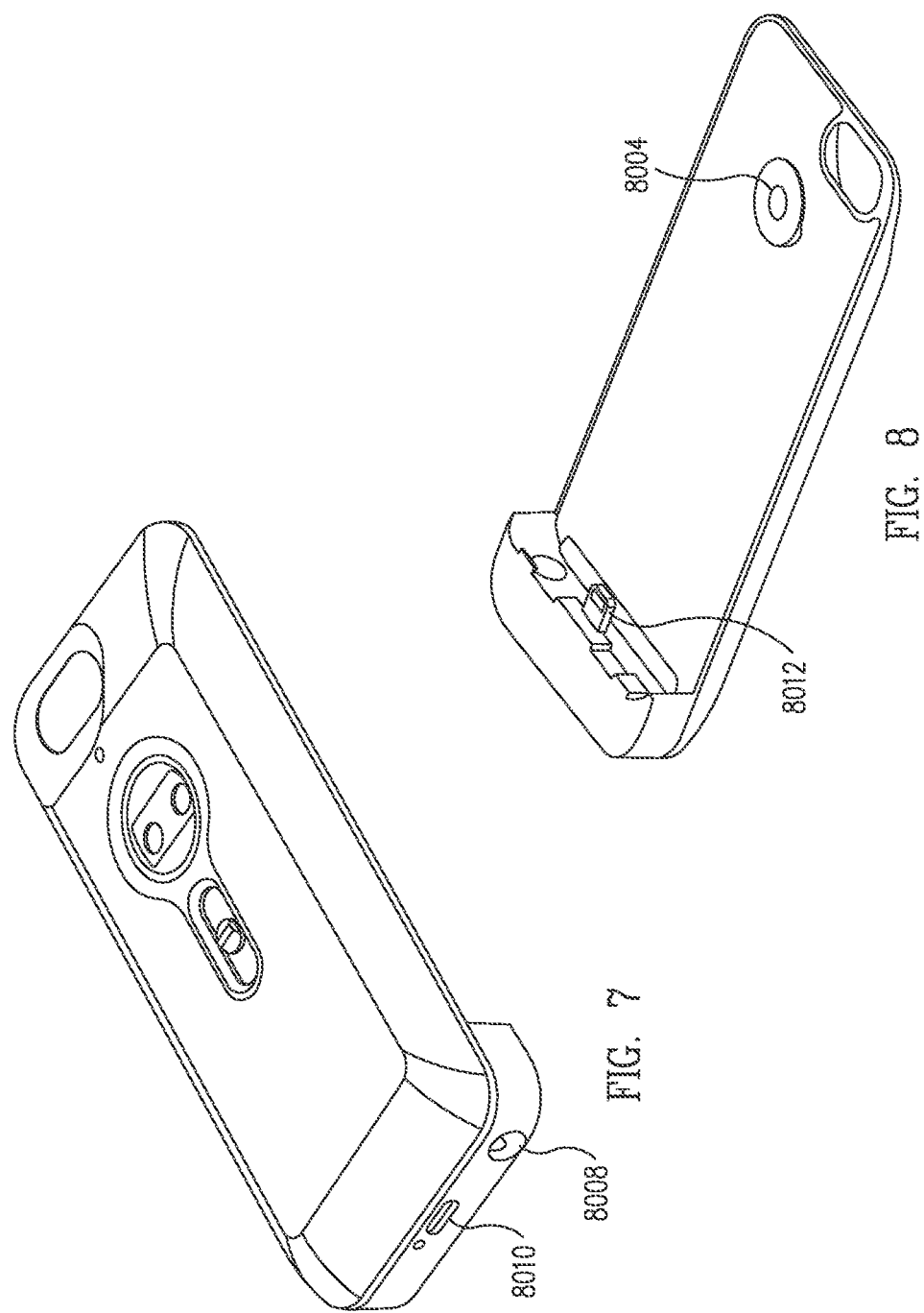

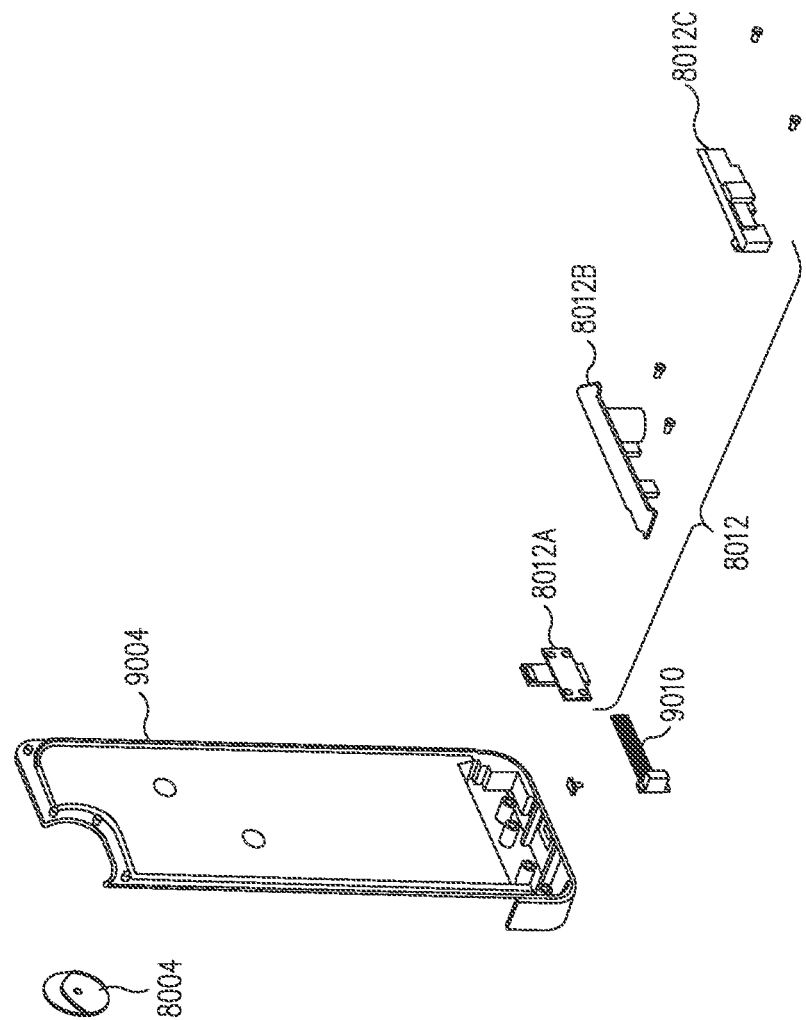
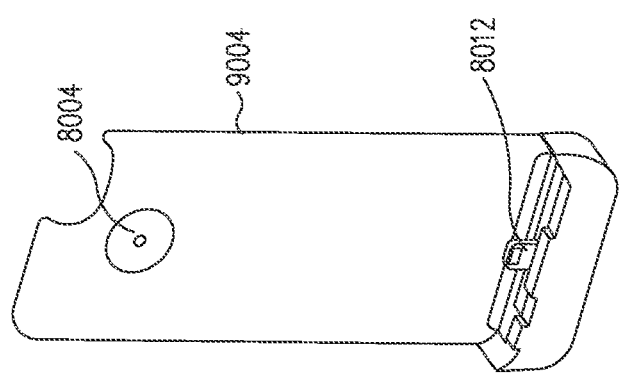
FIG. 10

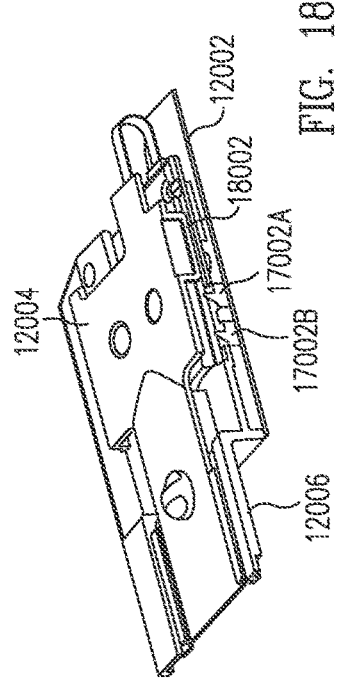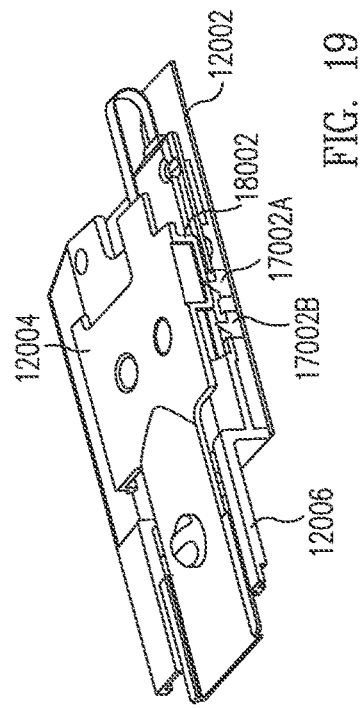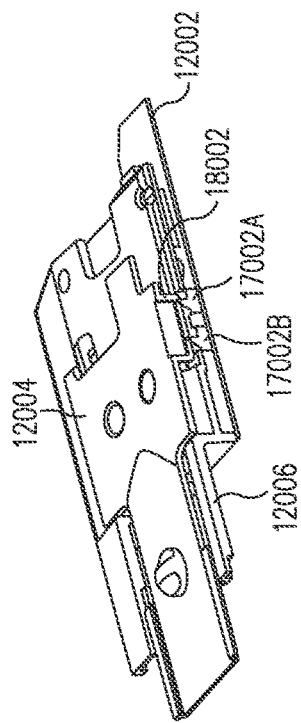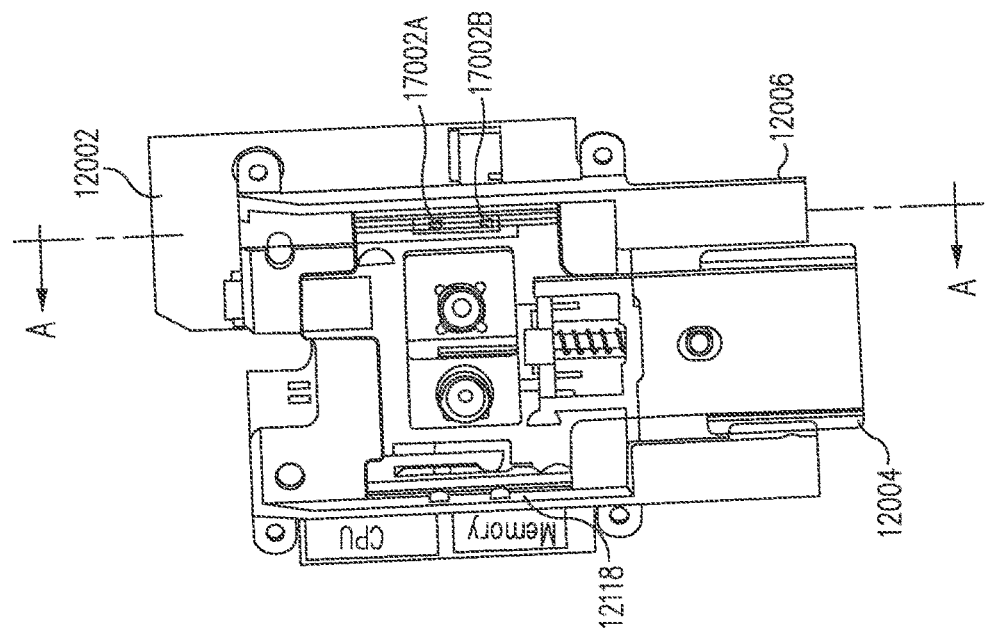

TECHNIQUES FOR DEVICE ATTACHMENT WITH DUAL BAND IMAGING SENSOR

CROSS-REFERENCE TO RELATED APPLICATIONS

This application is a continuation of International Patent Application No. PCT/US2014/073098 filed Dec. 31, 2014 and entitled "TECHNIQUES FOR DEVICE ATTACHMENT WITH DUAL BAND IMAGING SENSOR" which is incorporated herein by reference in its entirety.

International Patent Application No. PCT/US2014/073098 claims the benefit of U.S. Provisional Patent Application No. 61/923,742 filed Jan. 5, 2014 and entitled "TECHNIQUES FOR DEVICE ATTACHMENT WITH DUAL BAND IMAGING SENSOR" which is hereby incorporated by reference in its entirety.

U.S. patent application Ser. No. 14/281,883 filed May 19, 2014 and entitled "DEVICE ATTACHMENT WITH INFRARED IMAGING SENSOR" is hereby incorporated by reference in its entirety.

International Patent Application No. PCT/US2013/062433 filed Sep. 27, 2013 and entitled "DEVICE ATTACHMENT WITH INFRARED IMAGING SENSOR" is hereby incorporated by reference in its entirety.

U.S. Provisional Patent Application No. 61/880,827 filed Sep. 20, 2013 and entitled "DEVICE ATTACHMENT WITH INFRARED IMAGING SENSOR" is hereby incorporated by reference in its entirety.

U.S. patent application Ser. No. 13/901,428 filed May 23, 2013 and entitled "DEVICE ATTACHMENT WITH INFRARED IMAGING SENSOR" is hereby incorporated by reference in its entirety.

U.S. Provisional Patent Application No. 61/652,075 filed May 25, 2012 and entitled "DEVICE ATTACHMENT WITH INFRARED IMAGING SENSOR" is hereby incorporated by reference in its entirety.

U.S. Design patent application Ser. No. 29/423,027 filed May 25, 2012 and entitled "DEVICE ATTACHMENT WITH CAMERA" is hereby incorporated by reference in its entirety.

International Patent Application No. PCT/US2013/078551 filed Dec. 31, 2013 and entitled "INFRARED IMAGING DEVICE HAVING A SHUTTER" is hereby incorporated by reference in its entirety.

U.S. Provisional Patent Application No. 61/747,789 filed Dec. 31, 2012 and entitled "INFRARED IMAGING DEVICE HAVING A SHUTTER" is hereby incorporated by reference in its entirety.

U.S. patent application Ser. No. 13/966,052 filed Aug. 13, 2013 and entitled "INFRARED CAMERA SYSTEM HOUSING WITH METALIZED SURFACE" is hereby incorporated by reference in its entirety.

U.S. Provisional Patent Application No. 61/683,124 filed Aug. 14, 2012 and entitled "INFRARED CAMERA SYSTEM HOUSING WITH METALIZED SURFACE" is hereby incorporated by reference in its entirety.

International Patent Application No. PCT/US2014/059200 filed Oct. 3, 2014 and entitled "DURABLE COMPACT MULTISENSOR OBSERVATION DEVICES" is hereby incorporated by reference in its entirety.

U.S. patent application Ser. No. 14/101,245 filed Dec. 9, 2013 and entitled "LOW POWER AND SMALL FORM FACTOR INFRARED IMAGING" is hereby incorporated by reference in its entirety.

International Patent Application No. PCT/US2012/041744 filed Jun. 8, 2012 and entitled "LOW POWER AND SMALL FORM FACTOR INFRARED IMAGING" is hereby incorporated by reference in its entirety.

U.S. Provisional Patent Application No. 61/656,889 filed Jun. 7, 2012 and entitled "LOW POWER AND SMALL FORM FACTOR INFRARED IMAGING" is hereby incorporated by reference in its entirety.

U.S. Provisional Patent Application No. 61/545,056 filed Oct. 7, 2011 and entitled "NON-UNIFORMITY CORRECTION TECHNIQUES FOR INFRARED IMAGING DEVICES" is hereby incorporated by reference in its entirety.

U.S. Provisional Patent Application No. 61/495,873 filed Jun. 10, 2011 and entitled "INFRARED CAMERA PACKAGING SYSTEMS AND METHODS" is hereby incorporated by reference in its entirety.

U.S. Provisional Patent Application No. 61/495,879 filed Jun. 10, 2011 and entitled "INFRARED CAMERA SYSTEM ARCHITECTURES" is hereby incorporated by reference in its entirety.

U.S. Provisional Patent Application No. 61/495,888 filed Jun. 10, 2011 and entitled "INFRARED CAMERA CALIBRATION TECHNIQUES" is hereby incorporated by reference in its entirety.

U.S. patent application Ser. No. 14/099,818 filed Dec. 6, 2013 and entitled "NON-UNIFORMITY CORRECTION TECHNIQUES FOR INFRARED IMAGING DEVICES" is hereby incorporated by reference in its entirety.

International Patent Application No. PCT/US2012/041749 filed Jun. 8, 2012 and entitled "NON-UNIFORMITY CORRECTION TECHNIQUES FOR INFRARED IMAGING DEVICES" is hereby incorporated by reference in its entirety.

U.S. patent application Ser. No. 14/101,258 filed Dec. 9, 2013 and entitled "INFRARED CAMERA SYSTEM ARCHITECTURES" is hereby incorporated by reference in its entirety.

International Patent Application No. PCT/US2012/041739 filed Jun. 8, 2012 and entitled "INFRARED CAMERA SYSTEM ARCHITECTURES" is hereby incorporated by reference in its entirety.

U.S. patent application Ser. No. 14/138,058 filed Dec. 21, 2013 and entitled "COMPACT MULTI-SPECTRUM IMAGING WITH FUSION" is hereby incorporated by reference in its entirety.

U.S. Provisional Patent Application No. 61/748,018 filed Dec. 31, 2012 and entitled "COMPACT MULTI-SPECTRUM IMAGING WITH FUSION" is hereby incorporated by reference in its entirety.

U.S. patent application Ser. No. 14/299,987 filed Jun. 9, 2014 and entitled "INFRARED CAMERA SYSTEMS AND METHODS FOR DUAL SENSOR APPLICATIONS" is hereby incorporated by reference in its entirety.

U.S. patent application Ser. No. 12/477,828 filed Jun. 3, 2009 and entitled "INFRARED CAMERA SYSTEMS AND METHODS FOR DUAL SENSOR APPLICATIONS" is hereby incorporated by reference in its entirety.

U.S. patent application Ser. No. 14/138,040 filed Dec. 21, 2013 and entitled "TIME SPACED INFRARED IMAGE ENHANCEMENT" is hereby incorporated by reference in its entirety.

U.S. Provisional Patent Application No. 61/792,582 filed Mar. 15, 2013 and entitled "TIME SPACED INFRARED IMAGE ENHANCEMENT" is hereby incorporated by reference in its entirety.

U.S. Provisional Patent Application No. 61/746,069 filed Dec. 26, 2012 and entitled "TIME SPACED INFRARED IMAGE ENHANCEMENT" is hereby incorporated by reference in its entirety.

U.S. patent application Ser. No. 14/138,052 filed Dec. 21, 2013 and entitled "INFRARED IMAGING ENHANCEMENT WITH FUSION" is hereby incorporated by reference in its entirety.

U.S. Provisional Patent Application No. 61/793,952 filed Mar. 15, 2013 and entitled "INFRARED IMAGING ENHANCEMENT WITH FUSION" is hereby incorporated by reference in its entirety.

U.S. Provisional Patent Application No. 61/746,074 filed Dec. 26, 2012 and entitled "INFRARED IMAGING ENHANCEMENT WITH FUSION" is hereby incorporated by reference in its entirety.

U.S. patent application Ser. No. 14/246,006 filed Apr. 4, 2014 entitled "SMART SURVEILLANCE CAMERA SYSTEMS AND METHODS" is hereby incorporated by reference in its entirety.

U.S. patent application Ser. No. 13/437,645 filed Apr. 2, 2012 and entitled "INFRARED RESOLUTION AND CONTRAST ENHANCEMENT WITH FUSION" is hereby incorporated by reference in its entirety.

U.S. patent application Ser. No. 13/105,765 filed May 11, 2011 and entitled "INFRARED RESOLUTION AND CONTRAST ENHANCEMENT WITH FUSION" is hereby incorporated by reference in its entirety.

U.S. Provisional Patent Application No. 61/473,207 filed Apr. 8, 2011 and entitled "INFRARED RESOLUTION AND CONTRAST ENHANCEMENT WITH FUSION" is hereby incorporated by reference in its entirety.

U.S. patent application Ser. No. 12/766,739 filed Apr. 23, 2010 and entitled "INFRARED RESOLUTION AND CONTRAST ENHANCEMENT WITH FUSION" is hereby incorporated by reference in its entirety.

International Patent Application No. PCT/EP2011/056432 filed Apr. 21, 2011 and entitled "INFRARED RESOLUTION AND CONTRAST ENHANCEMENT WITH FUSION" is hereby incorporated by reference in its entirety.

U.S. patent application Ser. No. 14/029,716 filed Sep. 17, 2013 and entitled "ROW AND COLUMN NOISE REDUCTION IN THERMAL IMAGES" is hereby incorporated by reference in its entirety.

U.S. Provisional Patent Application No. 61/745,489 filed Dec. 21, 2012 and entitled "ROW AND COLUMN NOISE REDUCTION IN THERMAL IMAGES" is hereby incorporated by reference in its entirety.

U.S. Provisional Patent Application No. 61/745,504 filed Dec. 21, 2012 and entitled "PIXEL-WISE NOISE REDUCTION IN THERMAL IMAGES" is hereby incorporated by reference in its entirety.

U.S. patent application Ser. No. 13/622,178 filed Sep. 18, 2012 and entitled "SYSTEMS AND METHODS FOR PROCESSING INFRARED IMAGES" is hereby incorporated by reference in its entirety.

U.S. patent application Ser. No. 13/529,772 filed Jun. 21, 2012 and entitled "SYSTEMS AND METHODS FOR PROCESSING INFRARED IMAGES" is hereby incorporated by reference in its entirety.

U.S. patent application Ser. No. 12/396,340 filed Mar. 2, 2009 and entitled "SYSTEMS AND METHODS FOR PROCESSING INFRARED IMAGES" is hereby incorporated by reference in its entirety.

TECHNICAL FIELD

One or more embodiments of the invention relate generally to infrared imaging devices and more particularly, for example, to infrared imaging devices for portable equipment and, for example, to techniques to provide multi-spectrum imaging capabilities to portable equipment.

BACKGROUND

Various types of portable electronic devices, such as smart phones, cell phones, tablet devices, portable media players, portable game devices, digital cameras, and laptop computers, are in widespread use. These devices typically include a visible-light image sensor or camera that allows users to take a still picture or a video clip. One of the reasons for the increasing popularity of such embedded cameras may be the ubiquitous nature of mobile phones and other portable electronic devices. That is, because users may already be carrying mobile phones and other portable electronic devices, such embedded cameras are always at hand when users need one. Another reason for the increasing popularity may be the increasing processing power, storage capacity, and/or display capability that allow sufficiently fast capturing, processing, and storage of large, high quality images using mobile phones and other portable electronic devices.

However, image sensors used in these portable electronic devices are typically CCD-based or CMOS-based sensors limited to capturing visible light images. As such, these sensors may at best detect only a very limited range of visible light or wavelengths close to visible light (e.g., near infrared light when objects are actively illuminated with infrared light). Accordingly, there is a need to provide a true infrared imaging capability for mobile phones and other portable electronic devices.

SUMMARY

Various techniques are disclosed for providing a device attachment configured to releasably attach to and provide infrared imaging functionality to mobile phones or other portable electronic devices. For example, a device attachment may include a housing with a partial enclosure (e.g., a tub or cutout) on a rear surface thereof shaped to at least partially receive a user device, a multi-wavelength image sensor assembly disposed within the housing and configured to capture infrared image data and visible light image data, and a processing module communicatively coupled to the multi-wavelength sensor assembly and configured to transmit the infrared image data and/or the visible light image data to the user device.

In particular, various techniques for the device attachment to maintain proper calibration and alignment of the multi-wavelength sensor assembly are also disclosed. For example, in one embodiment, a device includes a thermal infrared imaging module, a non-thermal imaging module, and a bridge coupled to and extending between the thermal infrared imaging module and the non-thermal imaging module, wherein the bridge is configured to substantially maintain a position of the thermal imaging module relative to the non-thermal imaging module.

In another embodiment, a method includes providing a thermal infrared imaging module, securing the thermal infrared imaging module to a circuit board, providing a non-thermal imaging module, and coupling the thermal infrared imaging module to the non-thermal imaging module by a bridge to substantially maintain a position of the thermal imaging module relative to the non-thermal imaging module.

In another embodiment, a device includes a thermal infrared imaging module and a switch assembly configured to switch on and off the device and further configured to control a shutter configured to block external infrared energy from being received by the thermal infrared imaging module.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 5-8 illustrate a side view, a front view, a front perspective view, and a bottom perspective view, respectively, of the front portion of a device attachment according to an embodiment of the disclosure.

FIG. 10 illustrates an exploded perspective view of a bottom case assembly according to an embodiment of the disclosure.

FIG. 17 illustrates a front view of a camera module assembly in accordance with an embodiment of the disclosure.

FIGS. 18-20 are various perspective sectional views along line A-A of FIG. 17, illustrating how different ones of switches are turned on or off depending on a position of a slider assembly, in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
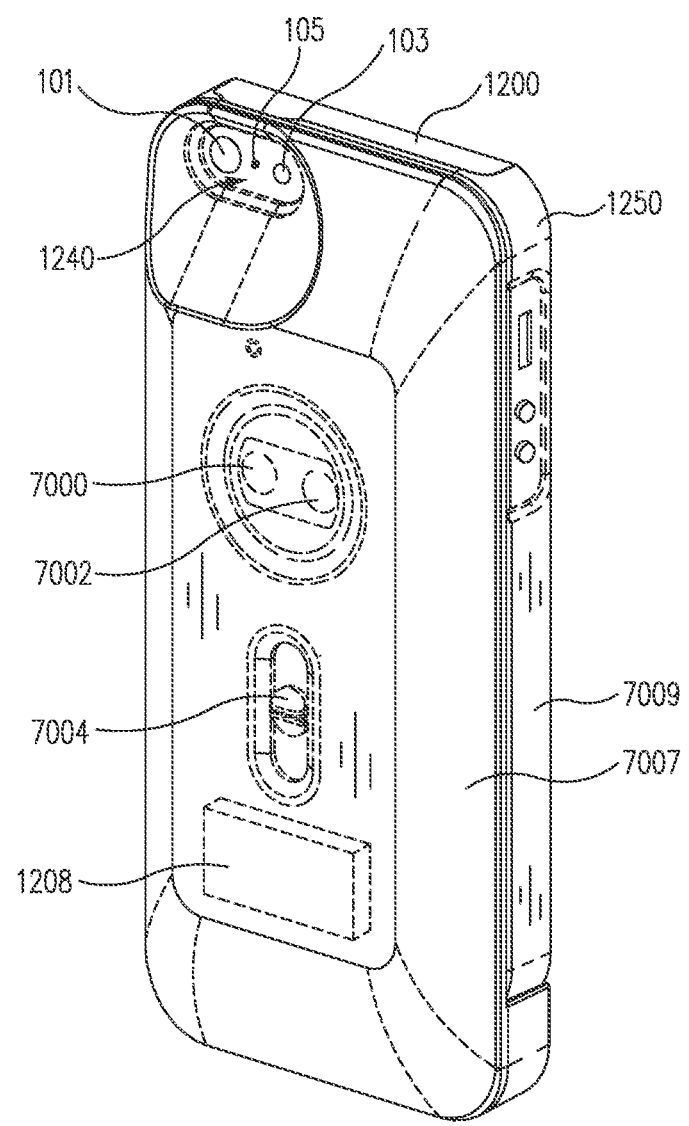
FIG. 1 illustrates a front perspective view of a device attachment in accordance with an embodiment of the disclosure.
Figure 2:
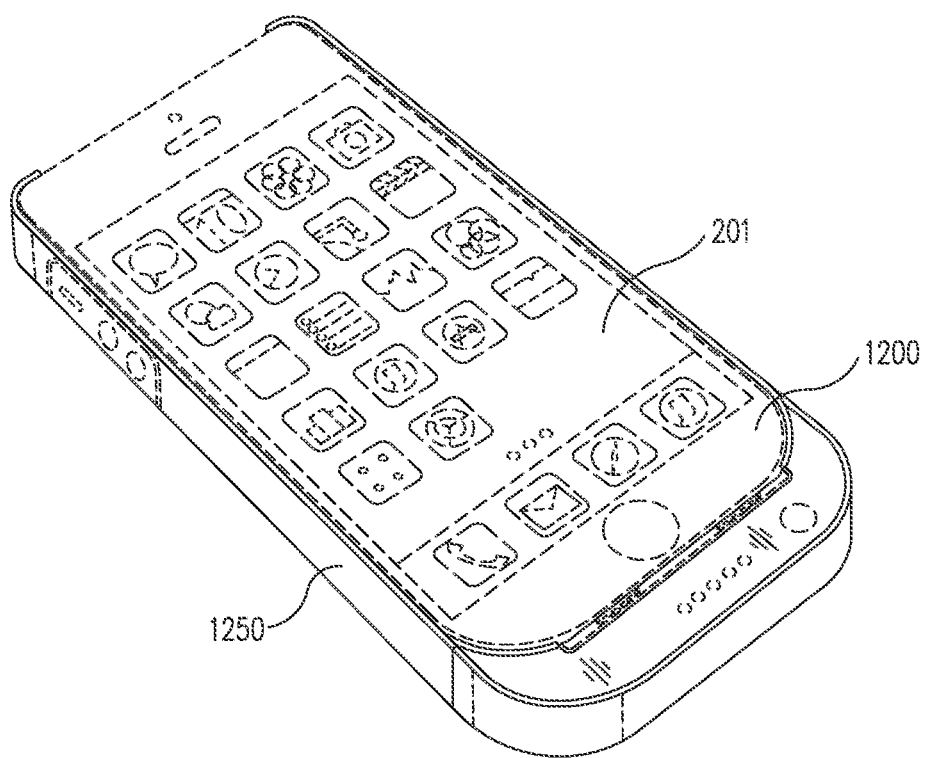
FIG. 2 illustrates a rear perspective view of a device attachment in accordance with an embodiment of the disclosure.

Referring now to FIGS. 1 and 2, various views are shown of a device attachment 1250 having an infrared imaging module 7000 and a non-thermal camera module 7002. In the embodiment of FIG. 1, a rear perspective view of a device attachment having a shape for receiving a device 1200 from Apple, Inc.® (e.g., iPhone™ devices, iPad™ devices, or iPod Touch™ devices) is shown. However, this is merely illustrative. If desired, device attachment 1250 may have a shape suitable for receiving devices from Samsung Electronics, Ltd.® (e.g., Galaxy Tab™ devices, other Galaxy™ devices, or other devices from Samsung) or a smart phone, tablet or portable electronic device from any other manufacturer.

As shown in FIG. 1, device attachment 1250 may include a camera window 1240 through which a device camera 101 (e.g., a non-thermal camera module such as a visible light camera module) can capture images, a device light source 103 (e.g., a camera flash or flashlight) can illuminate some or all of a scene, and or one or more other sensors 105 of device 1200 can receive or emit light. Device attachment 1250 may include a plurality of imaging components such as infrared imaging module 7000 and non-thermal camera module 7002. If desired, device attachment 1250 may also include a mechanical shutter such as user operable shutter 7004. User operable shutter 7004 may be moved by a user of device attachment 1250 to selectively block on unblock imaging components 7000 and 7002. In some embodiments, user operable shutter may power device attachment 1250 on or off when moved to block or unblock imaging components 7000 and 7002.

In some embodiments, user operable shutter 7004 may be used, for example, to protect imaging components 7000 and 7002 when not in use. Shutter 7004 may also be used as a temperature reference as part of a calibration process (e.g., a NUC process or other calibration processes) for infrared imaging module 7000 as would be understood by one skilled in the art. Device attachment 1250 may include a front portion 7007 and a rear portion 7009. Front portion 7007 may be formed from a housing that encloses functional components 1208 of the device attachment such as a battery, connectors, imaging components, processors, memory, communications components, and/or other components of a device attachment as described herein. Rear portion 7009 may be a structural housing portion having a shape that forms a recess into which user device 1200 can be releasably attached.

FIG. 2 is a front perspective view of the device attachment of FIG. 1 showing how a user device 1200 from Apple, Inc.® having a display 201 may be releasably attached to device attachment 1250 by inserting the device into a recess in a housing for the device attachment formed from a rear wall and at least one sidewall that at least partially surround the device.

Infrared imaging module 7000 may be implemented, for one or more embodiments, with a small form factor and in accordance with wafer level packaging techniques or other packaging techniques. Infrared imaging module 7000 may include a lens barrel, a housing, an infrared sensor assembly, a circuit board, a base, and a processing module.

An infrared sensor assembly may include a plurality of infrared sensors (e.g., infrared detectors) implemented in an array or other fashion on a substrate and covered by a cap. For example, in one embodiment, an infrared sensor assembly may be implemented as a focal plane array (FPA). Such a focal plane array may be implemented, for example, as a vacuum package assembly. In one embodiment, an infrared sensor assembly may be implemented as a wafer level package (e.g., singulated from a set of vacuum package assemblies provided on a wafer). In one embodiment, an infrared sensor assembly may be implemented to operate using a power supply of approximately 2.4 volts, 2.5 volts, 2.8 volts, or similar voltages.

Infrared sensors in infrared imaging module 7000 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. Infrared sensors may be implemented, for example, as microbolometers or other types of thermal imaging infrared sensors arranged in any desired array pattern to provide a plurality of pixels.

User device 1200 may be any type of portable electronic device that may be configured to communicate with device attachment 1250 to receive infrared images captured by infrared sensor assembly 7000 and/or non-thermal images such as visible light images from non-thermal imaging module 7002.

Infrared image data captured by infrared imaging module 7000 and/or non-thermal image data such as visible light image data captured by non-thermal imaging module 7002 may be provided to a processing module of device attachment 1250 and/or device 1200 for further processing.

The processing module may be configured to perform appropriate processing of captured infrared image data, and transmit raw and/or processed infrared image data to user device 1200. For example, when device attachment 1250 is attached to user device 1200, a processing module may transmit raw and/or processed infrared image data to user device 1200 via a wired device connector or wirelessly via appropriate wireless components further described herein. Thus, for example, user device 1200 may be appropriately configured to receive the infrared image data (e.g., thermal image data) and/or non-thermal image data from device attachment 1250 to display user-viewable infrared images (e.g., thermograms) to users on display 201 and permit users to store infrared image data non-thermal image data, multi-wavelength image data, and/or user-viewable infrared images. That is, user device 1200 may be configured to run appropriate software instructions (e.g., a smart phone "app") to function as an infrared camera that permits users to frame and take infrared, non-infrared, and/or combined still images, videos, or both. Device attachment 1250 and user device 1200 may be configured to perform other infrared imaging functionalities, such as storing and/or analyzing thermographic data (e.g., temperature information) contained within infrared image data.

Device attachment 1250 may also include a battery. The battery may be configured to be used as a power source for internal components of device attachment 1250, so that device attachment 1250 does not drain the battery of user device 1200 when attached. Further, the battery of device attachment 1250 may be configured to provide electrical power to user device 1200, for example, through a device connector. Thus, the battery may beneficially provide a backup power for user device 1200 to run and charge from. Conversely, various components of device attachment 1250 may be configured to use electrical power from a battery of user device 1200 (e.g., through a device connector), if a user desires to use functionalities of device attachment 1250 even when the battery of device attachment 1250 is drained.

Figure 3:
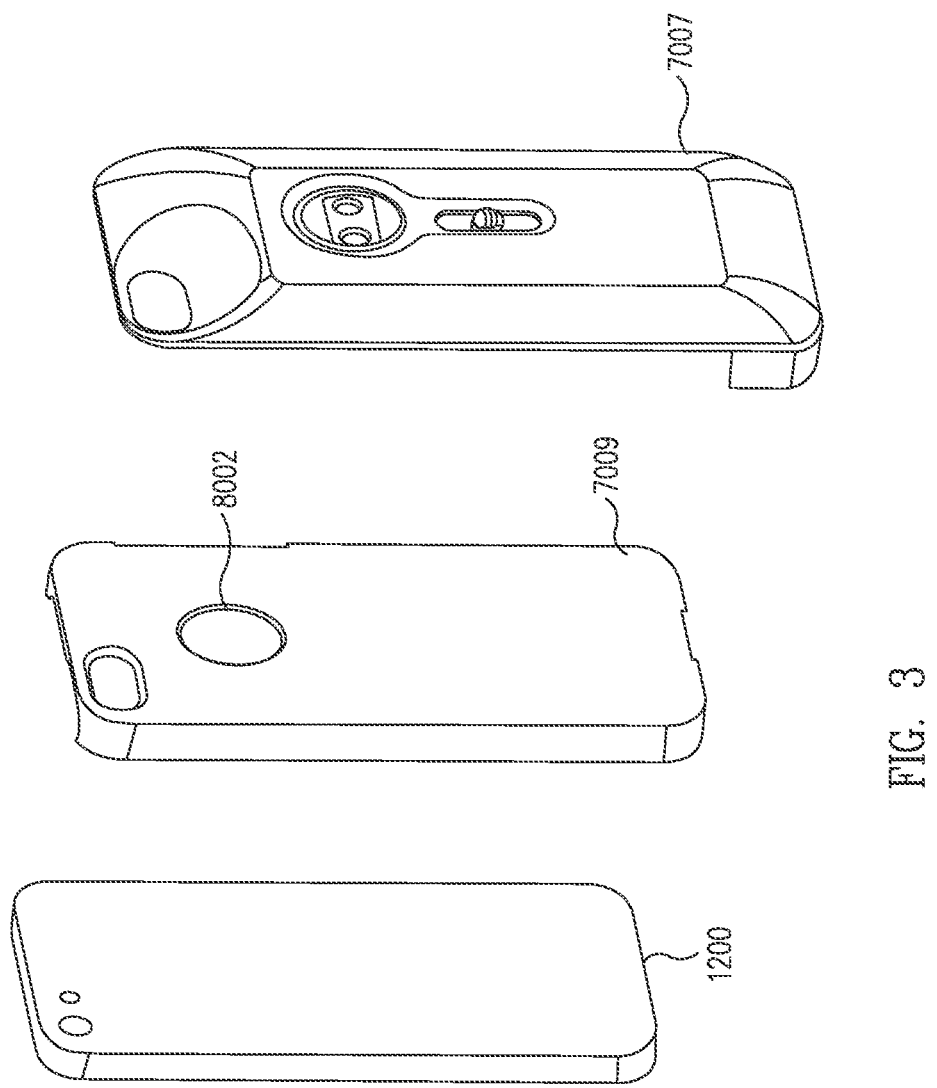
FIGS. 3 and 4 illustrate exploded perspective views of a front portion and a rear portion of a device attachment according to an embodiment of the disclosure.
Figure 4:
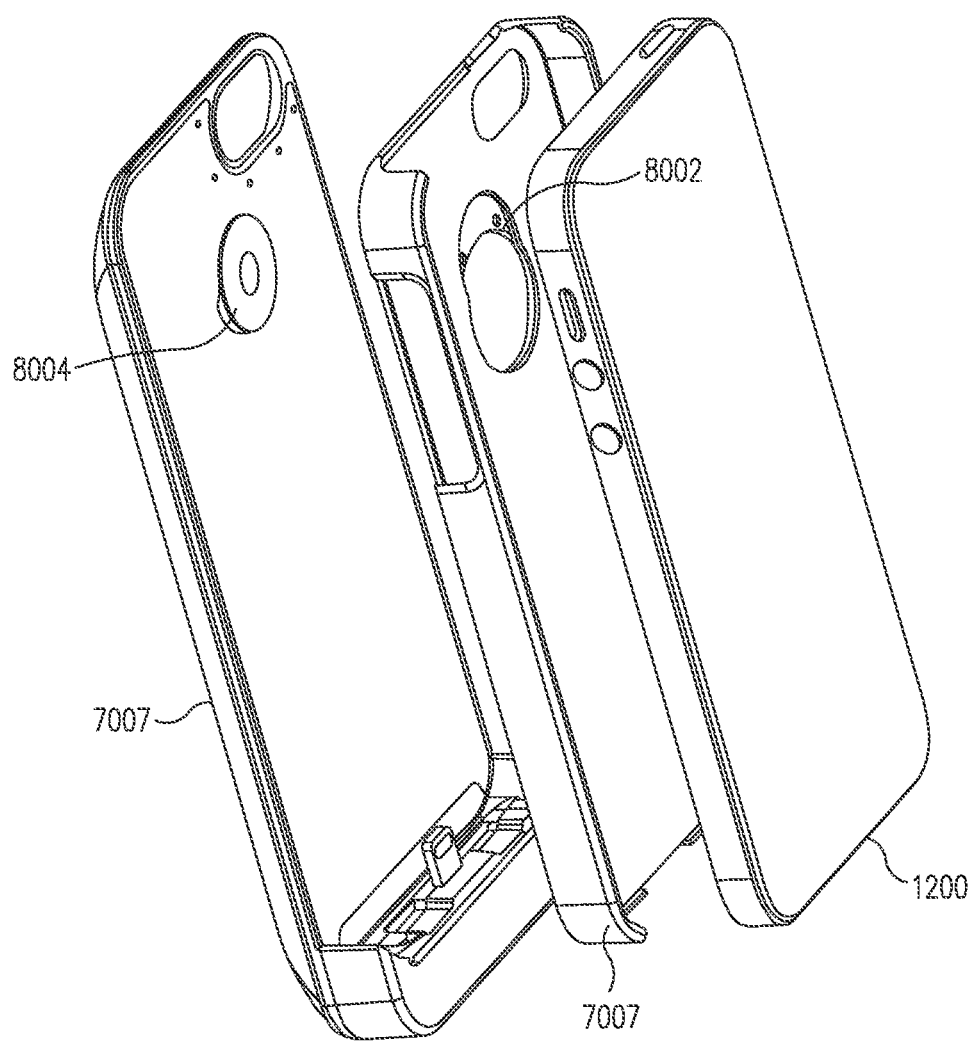
Figure 5:
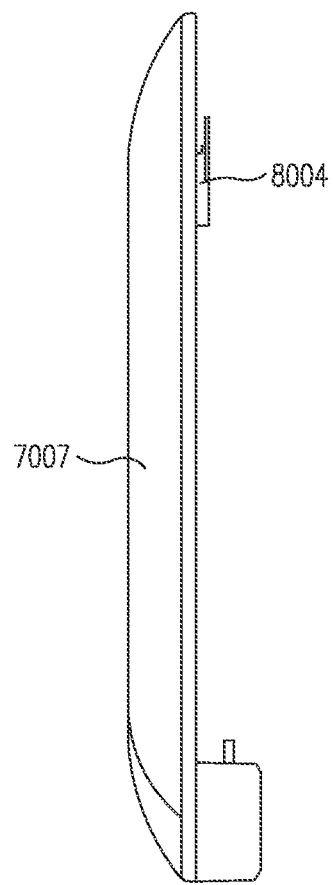
Figure 6:
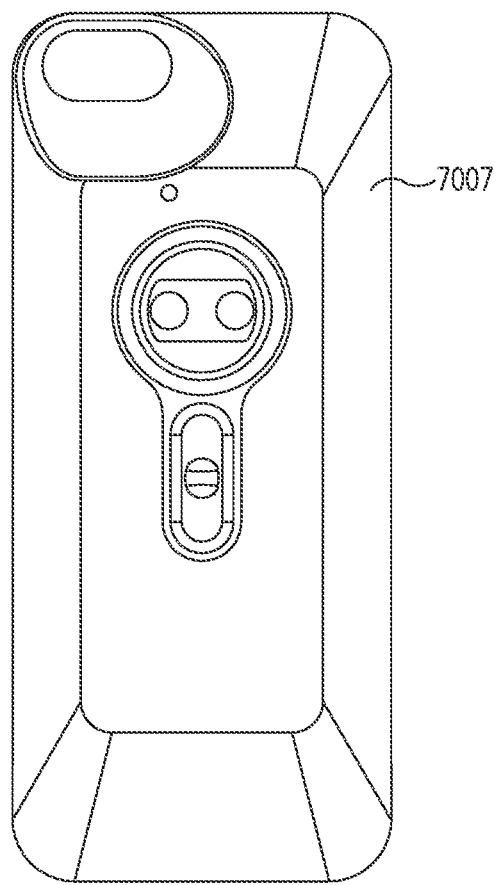

Various techniques to implement device attachment 1250 may be better illustrated with reference to FIGS. 3-12, which show various external and internal views of device attachment 1250 and components thereof. FIGS. 3 and 4 are exploded perspective views of front portion 7007 and rear portion 7009 of device attachment 1250, according to an embodiment of the disclosure. FIGS. 5-8 are a side view, front view, front perspective view, and bottom perspective view, respectively, of front portion 7007. As shown in FIG. 3 and discussed above, rear portion 7009 may have a shape that forms a recess into which user device 1200 can be releasably attached, whereas front portion 7007 may be formed to house various components of device attachment 1250. Front portion 7007 may be releasably attached to rear portion 7009. Thus, rear portion 7009 by itself may serve as a protective cover for user device 1200 when front portion 7007 is detached, for example. A cutout 8002 may be provided on rear portion 7009, for example, to allow a portion of housing of user device 1200 (e.g., where a logo of user device 1200 is placed) to show through while front portion 7007 is detached. Cutout 8002 may also engage a hanger 8004 of front portion 7007 to provide support when front portion 7007 is attached to rear portion 7009.

Because access to some features of user device 1200, such as various buttons, switches, connectors, speakers, and microphones, may be obstructed and/or occupied by device attachment 1250 when attached, device attachment 1250 may comprise various replicated components and/or cutouts to allow users to access such features. For example, front portion 7007 may comprise a replicated earphone/microphone jack 8008 and replicated device connector 8010 (e.g., a USB, micro USB, or other suitable peripheral device connector). Various components of device attachment 1250 may be configured to relay signals between replicated components and user device 1200. In some embodiments, cutouts and/or flexible cups (e.g., to allow users to press the buttons underneath) may be used instead of replicating buttons, switches, and/or connectors. The location, the number, and the type of replicated components and/or cutouts may be specific to user device 1200, and the various replicated components and cutouts may be implemented or not as desired for particular applications of device attachment 1250.

Front portion 7007 also includes a device connector 8012 that carries various signals and/or electrical power to and from user device 1200 when attached. Device connector 8012 may be disposed at a location that is suitably aligned with the corresponding device connector receptacle or socket of user device 1200, so that the device connector can engage the corresponding device connector receptacle or socket of user device 1200 when device attachment 1250 is attached to user device 1200. Device connector 8012 may also include a mechanical fixture (e.g., a locking/latched connector plug) used to support and/or align user device. Device connector 8012 may be implemented according to the connector specification associated with the type of user device 1200. For example, the device connector may implement a proprietary connector (e.g., an Apple® dock connector or Lightning™ connector for iPod™ and iPhone™) or a standardized connector (e.g., various versions of Universal Serial Bus (USB) connectors, Portable Digital Media Interface (PDMI), or other standard connectors as provided in user devices).

Figure 9:
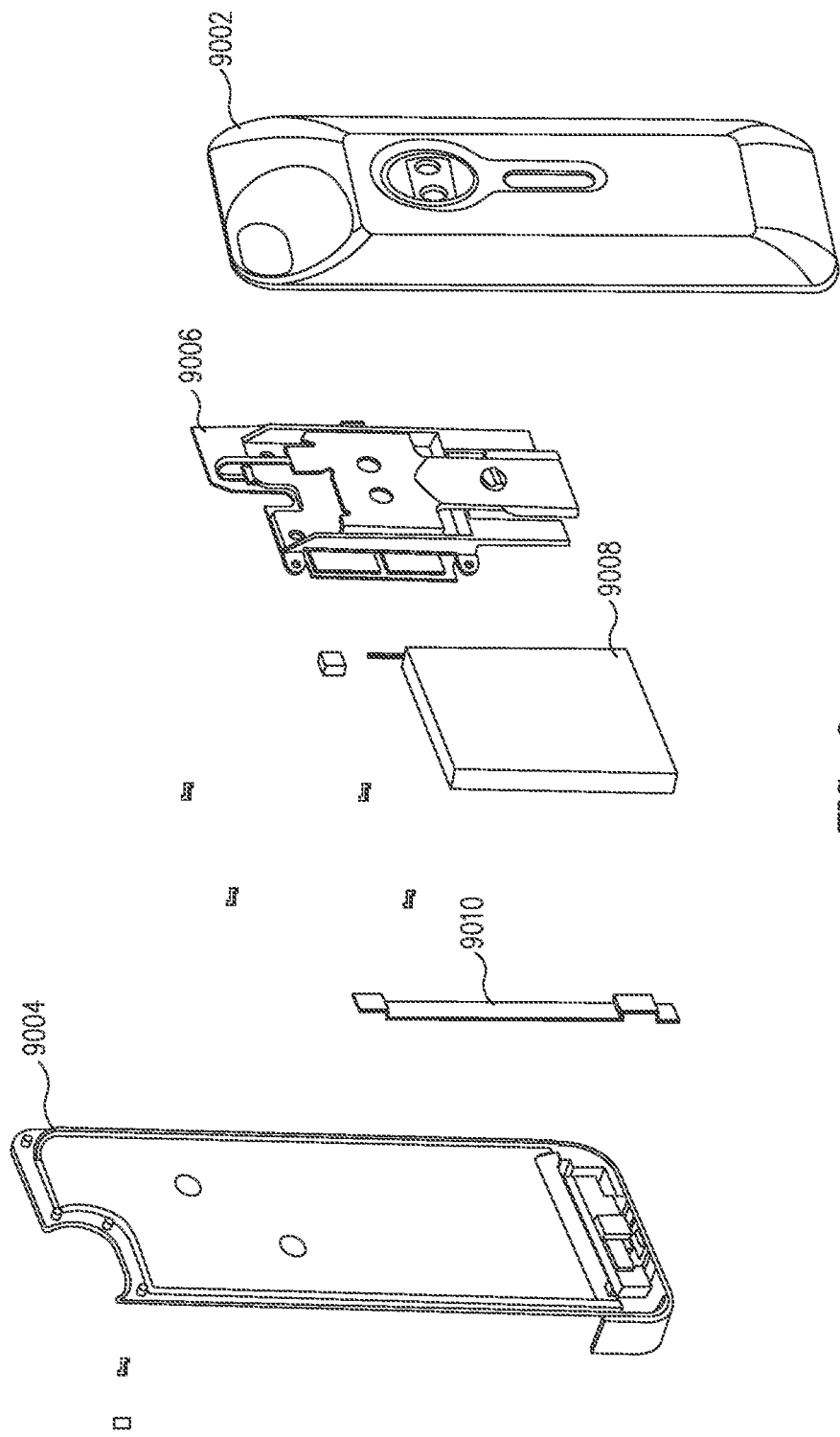
FIG. 9 illustrates an exploded perspective view of a front portion of a device attachment according to an embodiment of the disclosure.

FIG. 9 is an exploded perspective view of front portion 7007, according to an embodiment of the disclosure. Front portion 7007 may comprise a top case assembly 9002 and a bottom case assembly 9004. Enclosed by top and bottom case assemblies 9002 and 9004 are a camera module assembly 9006 having various circuits and components to provide infrared imaging or multi-spectral imaging (e.g., thermal and non-thermal imaging) capabilities, a battery 9008, and a flexible cable 9010 for connecting appropriate circuits or components of camera module assembly 9006 to device connector 8012 and/or replicated components 8008 and 8010.

FIG. 10 is an exploded perspective view of bottom case assembly 9004, according to an embodiment of the disclosure. In the example shown, device connector 8012 may be provided on a lower portion of bottom case assembly 9004. Device connector 8012 may comprise a connector plug 8012A, a connector cover 8012B, and a connect device circuit board 8012C where various electronic components and circuits may be provided to facilitate a connection to user device 1200 via device connector 8012.

Figure 11:
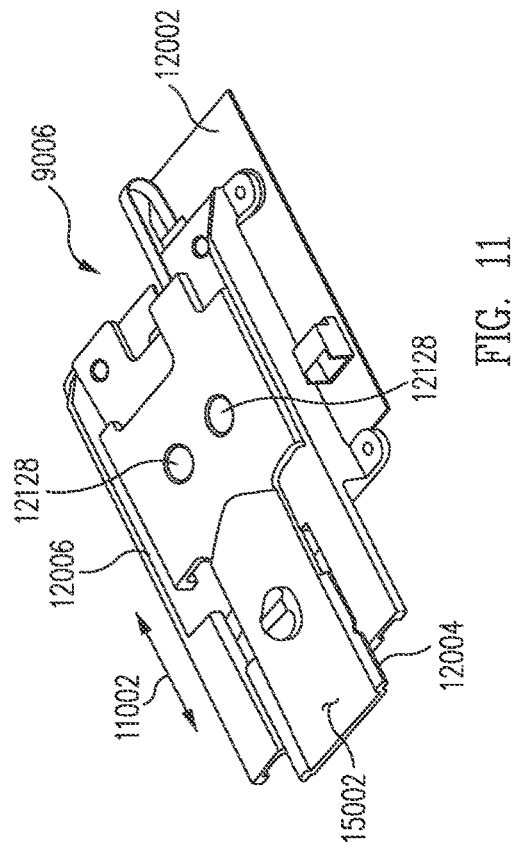
FIG. 11 illustrates a perspective view of a camera module assembly according to an embodiment of the disclosure
Figure 12:
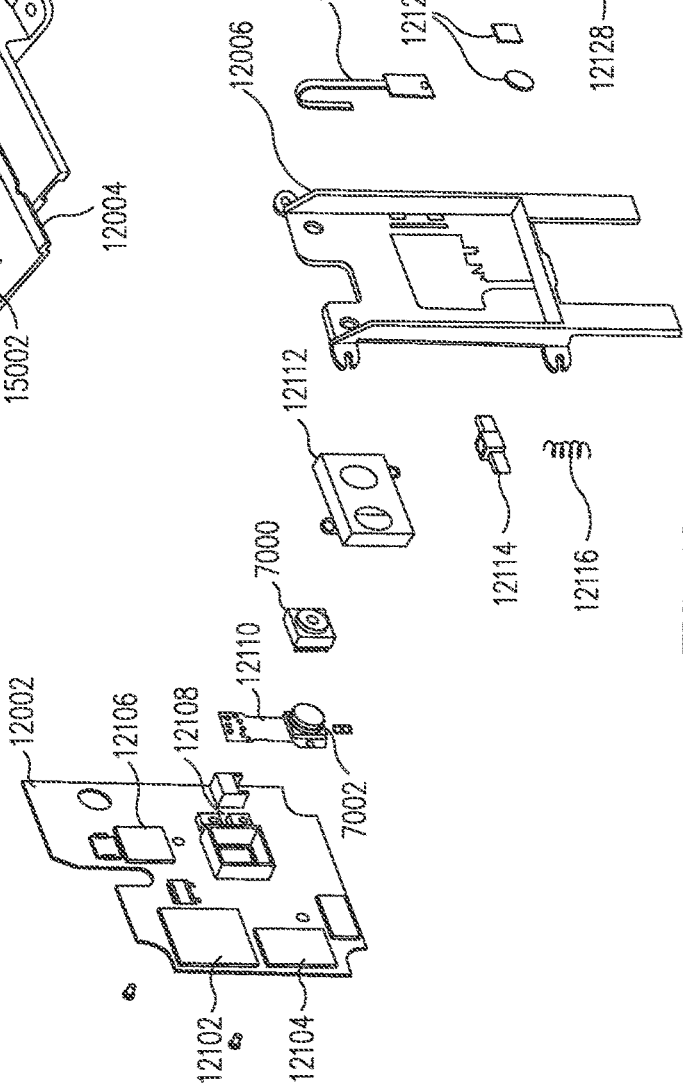
FIGS. 12 and 13 illustrate exploded perspective views of a camera module assembly in accordance with an embodiment of the disclosure.
Figure 13:
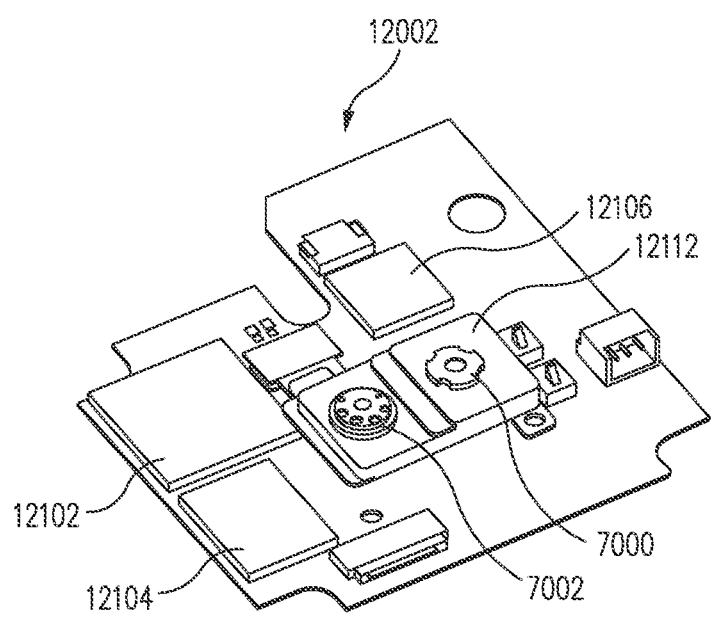

FIG. 11 is a perspective view of camera module assembly 9006, and FIGS. 12 and 13 are exploded perspective view of camera module assembly 9006 showing various components thereof, in accordance with an embodiment of the disclosure. Camera module assembly 9006 may comprise a camera module circuit board 12002 (e.g., a printed circuit board), a slider assembly 12004 (e.g., to implement user operable shutter 7004), and a module frame 12006 configured to support module circuit board 12002 and slider assembly 12004.

Camera module circuit board 12002 may include various electrical and electronic components and circuits to provide infrared imaging and/or multi-spectral imaging capabilities for user device 1200. For example, a processor 12102, a memory device 12104, and other logic devices 12106 may be provided and configured to perform appropriate processing of captured infrared image data, and to transmit raw and/or processed infrared image data to user device 1200 as described above with reference to FIG. 1.

Camera module circuit board 12002 may include a socket 12108 configured to receive infrared imaging module 7000. Infrared imaging module 7000 received in socket 12108 may be substantially fixed in place relative to camera module circuit board 12002 and electrically connected to camera module circuit board 12002 via appropriate pins of socket 12108. In some embodiments, non-thermal imaging module 7002 may not be received by a socket on camera module circuit board 12002, but instead may be electrically connected to camera module circuit board 12002 via flexible cable 12110. In such embodiments, non-thermal image module 7002 may be substantially fixed in position and orientation relative to infrared imaging module 7000 by a bridge 12112, rather than being substantially fixed in its own position and orientation relative to camera module circuit board 12002. FIG. 13 shows camera module circuit board 12002 with bridge 12112 holding infrared imaging module 7000 and non-thermal imaging module 7002 substantially fixed relative to each other in position and orientation.

By fixing relative positions and orientations of infrared imaging module 7000 and non-thermal imaging module 7002 together by bridge 12112, the alignment of infrared imaging module 7000 and non-thermal imaging module 7002 may be well-maintained throughout the service life of device attachment 1250, while at the same time allowing quick and repeatable alignment with fewer parts during assembly, as further described herein. As would be appreciated by one skilled in the art, achieving and maintaining proper alignment of different imaging modules are of great importance in imaging, but cannot be trivially accomplished with conventional techniques.

Figure 14:
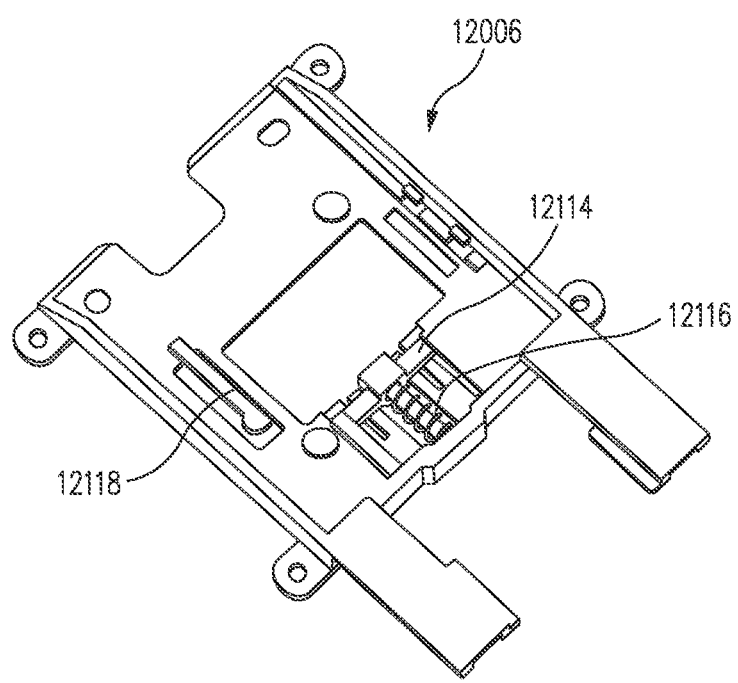
FIG. 14 illustrates a perspective view of a module frame with a push part and a spring, in accordance with an embodiment of the disclosure.

Referring also to FIG. 14, FIG. 14 shows a perspective view of module frame 12006 with a push part 12114 and a spring 12116 assembled in place, in accordance with an embodiment of the disclosure. Push part 12114 may engage a corresponding portion of slider assembly 12004, and together with spring 12116, provide a return force and appropriate resistance against sliding movement of slider assembly 12004, for example, to guide slider assembly 12006 to desired neutral positions, as further described herein. Module frame 12006 may also have a position hook 12118 to guide and provide detents positions (e.g., on and off positions) for slider assembly 12004 by engaging a corresponding member of slider assembly 12004.

Figure 15:
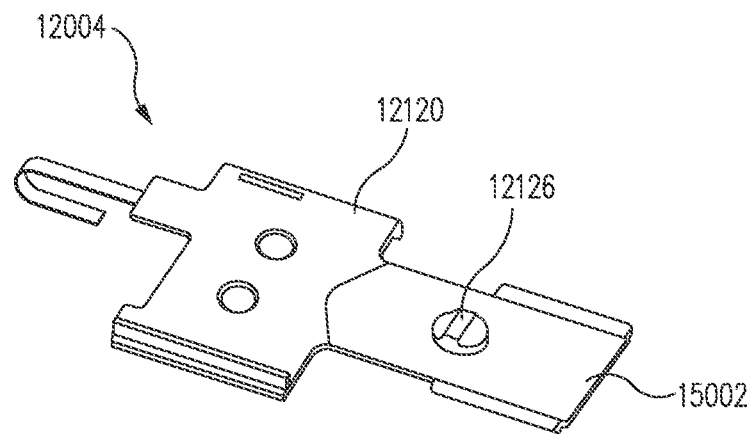
FIGS. 15 and 16 illustrate a top and a bottom perspective view, respectively, of a slider assembly with a slider plate, protective windows, a temperature sensor, and a slider button assembled in place, in accordance with an embodiment of the disclosure.
Figure 16:
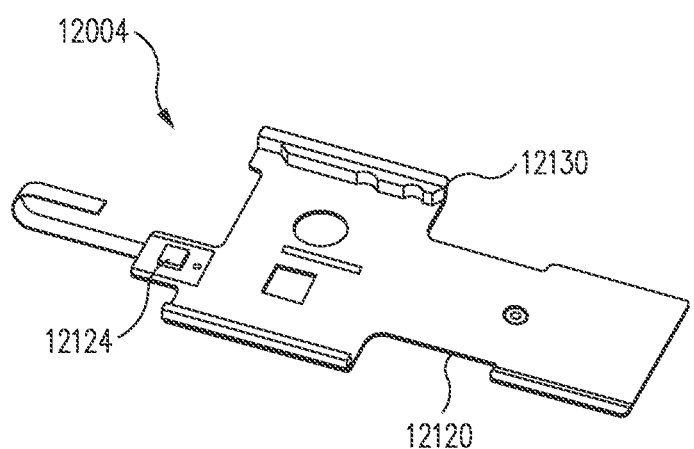

Referring also to FIGS. 15 and 16, a top and a bottom perspective views, respectively, are shown of slider assembly 12004 with a slider plate 12120, protective windows 12122, a temperature sensor 12124, and a slider button 12126 assembled in place, in accordance with an embodiment of the disclosure. Slider plate 12120 may have a position slot 12130 to correspondingly engage position hook 12118 of module frame 12006 described above.

Protective windows 12122 may be placed to cover corresponding openings 12128 of slider plate 12120 to protect lenses and other parts of infrared imaging module 7000 and non-thermal imaging module 7002 from external elements, while passing corresponding spectrum of electromagnetic radiation through (e.g., infrared radiation for infrared imaging module 7000 and non-thermal radiation for non-thermal imaging module 7002).

Slider button 12126 may be provided to aid a user in actuating slider assembly 12004 by use of a finger or otherwise facilitate actuation of slider assembly 12004. In the example shown with reference to FIG. 11, slider button 12126 may be used to push slider assembly 12004 along directions indicated by arrows 11002 to selectively move openings 12128 in front of or away from imaging modules 7000 and 7002.

Temperature sensor 12124 may be utilized to obtain a temperature reading in connection with calibration operations using slider plate 12120 as a calibration shutter (e.g., as a black body for calibration), as further described herein.

As discussed above and described in further detail below, slider assembly 12004 (e.g., user operable shutter 7004) may advantageously permit calibration of infrared imaging module 7000 by providing a stable and reliable black body, while also providing a multi-position switch functionality to allow a user to operate device attachment 1250 and/or user device 1200, all in a compact package suitable for portable equipment attachments.

Multi-position switch aspects of slider assembly 12004 may be better understood with reference to FIGS. 17-24. FIG. 17 is a front view of camera module assembly 9006, with slider assembly 12004 shown in outline only for ease of understanding, in accordance with an embodiment of the disclosure. In the example of FIG. 17, a plurality of switches 17002 (individually referred to as switch 17002A and 17002B) may be provided on camera module circuit board 12002, which may be positioned relative to position hook 12118 such that appropriate ones of switches 17002 may be turned on or off based on the positions of slider assembly 12004 relative to module frame 12006 as guided by position hook 12118.

FIGS. 18-20 show perspective sectional views along line A-A of FIG. 17, illustrating how different ones of switches 17002 are turned on or off depending on the position of slider assembly 12004 to provide multi-position switching, in accordance with an embodiment of the disclosure. In the example of FIG. 18, both switches 17002 are turned off with slider assembly 12004 in a first position (e.g., in its topmost position (rightmost position according to the orientation of camera module assembly 9006 in FIGS. 18-20)). When slider assembly 12004 is in a second position (e.g., a middle position), switch 17002A may be turned on by a trigger member 18002 provided on (e.g., formed on or attached to) slider plate 12120 while switch 17002B remains turned off, as shown in FIG. 19. FIG. 20 shows both switches 17002A and 17002B being turned on by trigger member 18002 when slider assembly 12004 is displaced to a third position (e.g., in its bottommost position). Thus, three distinct combinations of switching status corresponding to three distinct positions may be obtained in the example illustrated with FIGS. 18-20. For example, a particular one of the three positions may be utilized to signal device attachment 1250 to perform calibration of infrared imaging module 7000 viewing a black body provided by slider assembly 12004 configured to cover the field-of-view of infrared imaging module 7000 when in that particular position, as further described herein.

Figure 21:
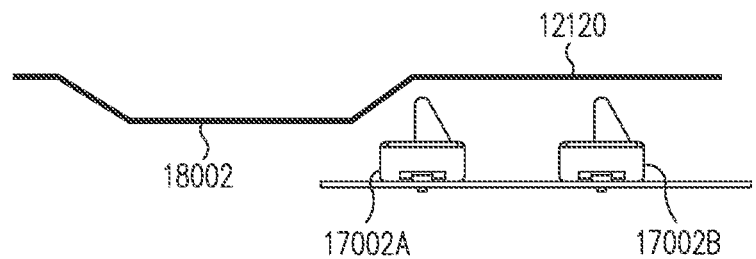
FIGS. 21-23 illustrate various schematic views corresponding to FIGS. 18-20 and showing switching statuses, in accordance with an embodiment of the disclosure.
Figure 22:
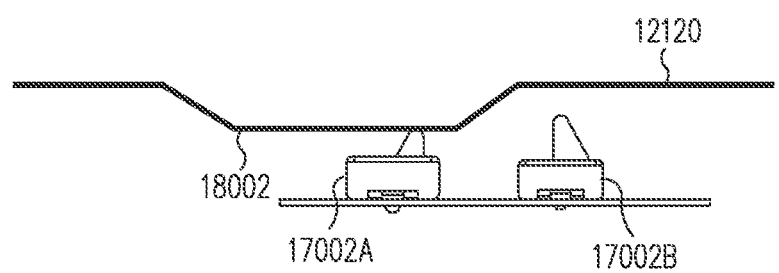
Figure 23:
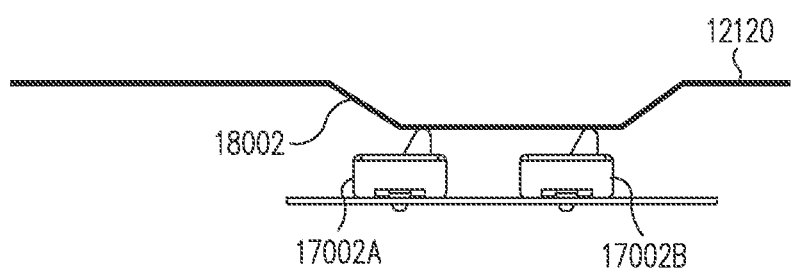

FIGS. 21-23 are schematic views corresponding to FIGS. 18-20 and showing switching statuses, in accordance with an embodiment of the disclosure. As may be appreciated, a multi-position switching functionality with more than three positions may be provided using additional switches, consistent with the spirit and scope of the present disclosure.

Figure 24:
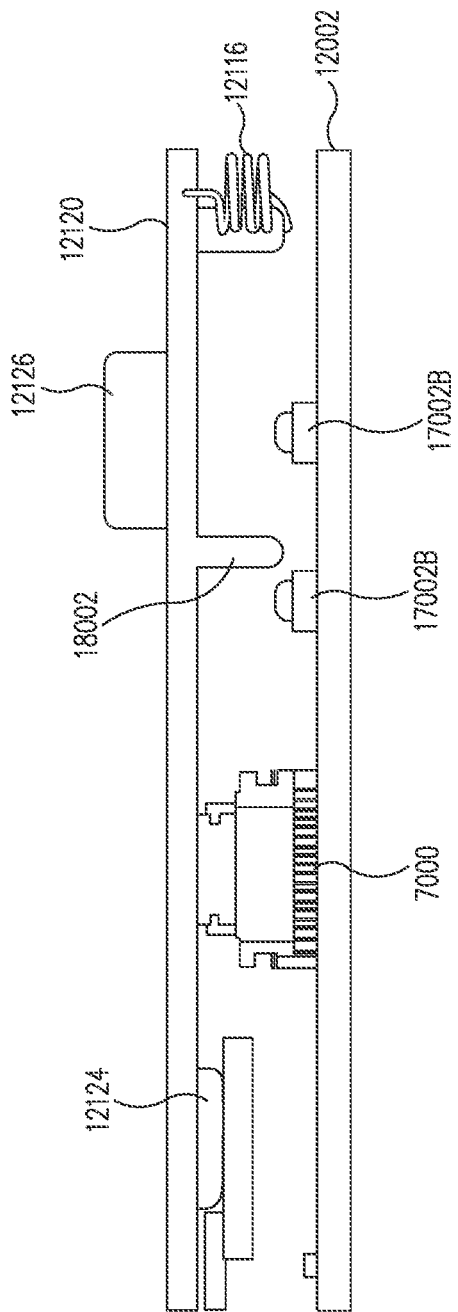
FIG. 24 is a sectional view along line A-A of FIG. 17 in accordance with an embodiment of the disclosure.

In some embodiments, switches 17002 may be mechanical switches that can be triggered on or off by trigger member 18002 implemented by a bar protruding from a surface of slider plate 12120. FIG. 24 is a sectional view along line A-A of FIG. 17, with mechanical switches implementing switches 17002 and protruding bar implementing trigger member 18002, in accordance with an embodiment of the disclosure. In one non-limiting and specific example, mechanical switches may be tact switches, such as tact switch model EVQ-PJS04K available from Panasonic®. In other embodiments, switches 17002 may be implemented with non-contact switches and triggering member 18002 may be implemented with an appropriate corresponding component. For example, non-contact switches may be Hall-effect sensor with triggering member 18002 being implemented with appropriate configuration of magnets to trigger the Hall-effect sensors. In another example, non-contact switches may be optical sensors such as IR proximity sensors or light sensors, with triggering member 18002 being implemented with appropriate structure and material to reflect, block, or transmit light for the optical sensors.

As discussed, slider assembly 12004 according to various embodiments may also serve as a uniform and stable black body for calibration of infrared imaging module 7000, for example when slider assembly 12004 is selectively moved by a user to a position that places switches 17002 in a combination of on or off states associated with starting a calibration operation by device attachment 1250. In one example, a calibration operation may be carried out while a user holds slide assembly 12004 at a particular position against a resilient return force provided by spring 12116.

Figure 25:
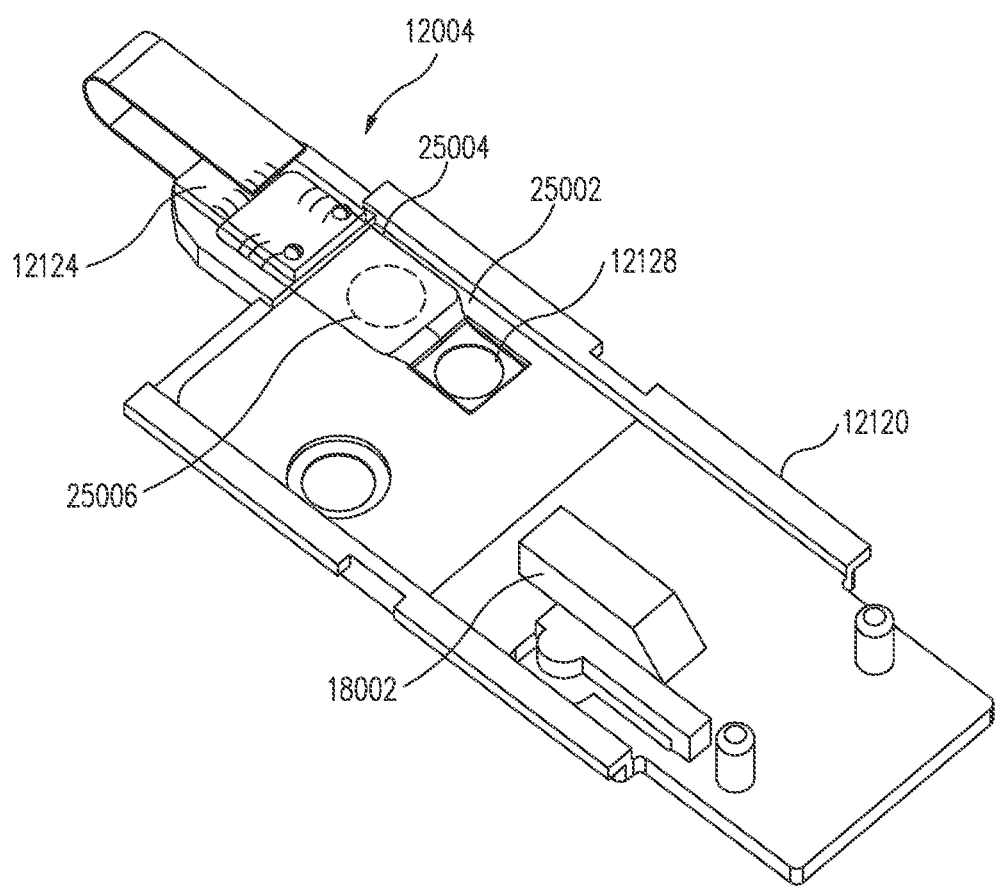
FIG. 25 illustrates a bottom perspective view of a slider assembly in accordance with an embodiment of the disclosure.

FIG. 25 shows another bottom perspective view of slider assembly 12004 in accordance with an embodiment of the disclosure. To provide a black body for calibration when moved to a desired position, slider plate 12120 according to one embodiment may be provided with a metal plate 25002, while slider plate 12120 may be made of injection-molded plastic. In this way, metal plate 25002 may serve as a black body and may be kept at a smaller size (e.g., compared with the entire size of slider plate 12120) to better resist external influences such as ambient airflow or heat for a more uniform and stable temperature gradient when viewed by infrared imaging module 7000. Metal plate 25002 according to various embodiments may be soldered or plated onto slider plate 12120, formed as a metallization layer on slider plate 12120, or otherwise provided on slider plate 12120. Metal plate 25002 may be made of aluminum, copper, or other material with desirable heat conductivity or other properties.

Slider plate 12120 may be provided as a molded interconnect device (MID) having MID traces 25004 embedded within (shown in FIG. 25 for ease of understanding). As shown in FIG. 25, in some embodiments, MID traces 25004 may be utilized to transfer heat from metal plate 25002 to temperature sensor 12124 for an accurate black body temperature measurement for calibration purposes. In one embodiment, MID traces 25004 may be extended into openings 12128 to transfer heat.

In some embodiments, temperature sensor 12124 may be soldered directly onto appropriate MID trace contact surface formed on slider plate 12120. In one embodiment, temperature sensor 12124 may be placed adjacent to or near a portion 25006 of metal plate 25002 that covers the field-of-view of infrared imaging module 7000 when slider assembly 12004 is moved to a position for calibration, so that a more accurate black body temperature reading may be obtained. In one specific but non-limiting example, temperature sensor 12124 may be implemented using a digital temperature sensor such as temperature sensor model MAX31725 available from Maxim™. However, other suitable temperature sensors based on thermistors, thermopiles, thermocouples, pyroelectrics, or other temperature sensing techniques may be utilized as desired for particular applications.

Referring again to FIGS. 15 and 16, in the embodiments illustrated with reference to FIGS. 15 and 16, slider plate 12120 may be made of aluminum instead of MID molded plastic, and may be utilized as a black body without having a separate metal plate. Embodiments of slider plate 12120 that may be made of copper or other metal in addition to or in place of aluminum are also contemplated. In some embodiments, an insulator 15002 (e.g., plastic film, plastic cover, or other plate, sheet, or film made from a suitable insulating material) may be provided to cover a portion of slider plate 12120 not being utilized as a black body, so as to reduce external influence such as ambient heat or airflow. In one example, insulator 15002 may be a plastic film configured to cover a portion of slider plate 12120 near and/or around slider button 12126, so as to block heat from external sources such as user's fingers, for example. In this regard, slider button 12126 may also be made from a suitable insulating material such as plastic to reduce thermal influence on slider plate 12120 from external sources.

Therefore, for example, slider assembly 12004 according to one or more embodiments may be implemented with a small number of parts while providing both a multi-position switching functionality and a stable and uniform black body suitable for calibration of infrared imaging module 7000 or other imagers, thereby reducing production cost and advantageously permitting a compact packaging beneficial for implementing a device attachment with multi-spectral imaging capabilities for a mobile phone and other portable devices. Slider assembly 12004 according to one or more embodiments may be made of or incorporate a thin plate of highly heat-conductive material where it may be used as a black body for calibration, with a temperature sensor 12124 appropriately disposed close to an area of slider plate 12120 that acts as a black body in connection with a selective movement of slider assembly 12004 by a user to select one of multiple switch positions configured to trigger a calibration operation. As such, in one or more embodiments, desirable temperature uniformity may be obtained between temperature sensor 12124 and the black body area of slider plate 12120 that may beneficially permit accurate calibration of infrared imaging module 7000. In one or more embodiments, insulator 15002 and insulated slider button 12126 may be provided, which may further improve thermal uniformity and stability of slider plate 12120 serving as a black body.

Figure 26:
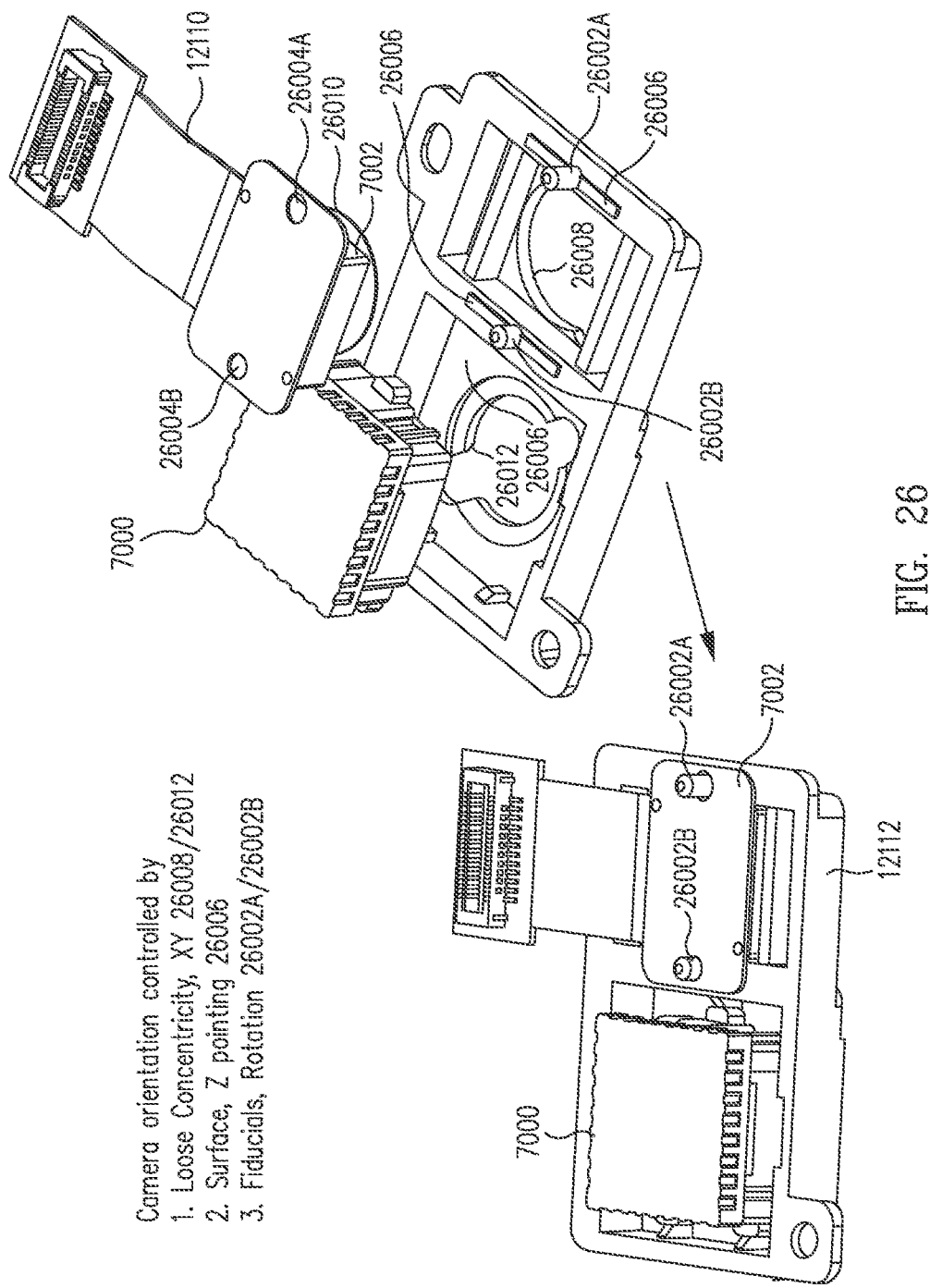
FIG. 26 illustrates a rear exploded perspective view and a rear assembled perspective view of an infrared imaging module, a non-thermal imaging module, and bridge for receiving the imaging modules in accordance with an embodiment of the disclosure.

FIG. 26 illustrates a rear exploded perspective view and a rear assembled perspective view of an infrared imaging module 7000 and a non-thermal imaging module 7002 and a bridge 12112 for receiving the imaging modules in accordance with an embodiment of the disclosure. As shown in FIG. 26, bridge 12112 may include fixturing posts 26002A and 26002B that are configured to pass through corresponding openings 26004A and 26004B on non-thermal imaging module. As shown, fixturing post 26002A may be longer than fixturing post 26002B so that fixturing post 26002A can extend to a surface of a printed circuit board and provide support for the non-thermal imaging module.

Bridge 12112 may include orientation control features such as surfaces 26006, 26008, and 26012 that limit the movement of imaging modules 7000 and 7002 when inserted in bridge 12112. For example, surface 26008 of bridge 12112 can provide support against surface 26010 of non-thermal imaging module 7002 to prevent translational motion of non-thermal imaging module 7002 within bridge 12112.

More specifically in one or more embodiments, surface 26006 (e.g., top interior surface or ceiling of bridge 12112 engaging infrared imaging module 7000 and/or top interior surface or ceiling of bridge 12112 engaging non-thermal imaging module 7002) may be configured to control and maintain a relative tilt (e.g., a pointing direction in the optical axis or a referenced Z axis) of imaging modules 7000 and 7002. More specifically in one or more embodiments, surface 26008 (e.g., an inner circumference of an opening configured to engage an outer circumference 26010 of a lens barrel of non-thermal imaging module 7002) and/or surface 26012 (e.g., an inner circumference of an opening configured to engage an outer circumference of a lens barrel of infrared imaging module 7000) may be configured to control and maintain a relative concentricity (e.g., translation in referenced X and Y axes, such as X and Y axes normal to the optical axis of imaging module 7000/7002) of non-thermal imaging module 7002 and infrared imaging module 7000. More specifically in one or more embodiments, fixturing posts 26002A and 26002B (e.g., fiducials) engaging corresponding openings 26004A and 26004B may be configured to control and maintain relative rotational offset of imaging modules 7000 and 7002.

Figure 27:
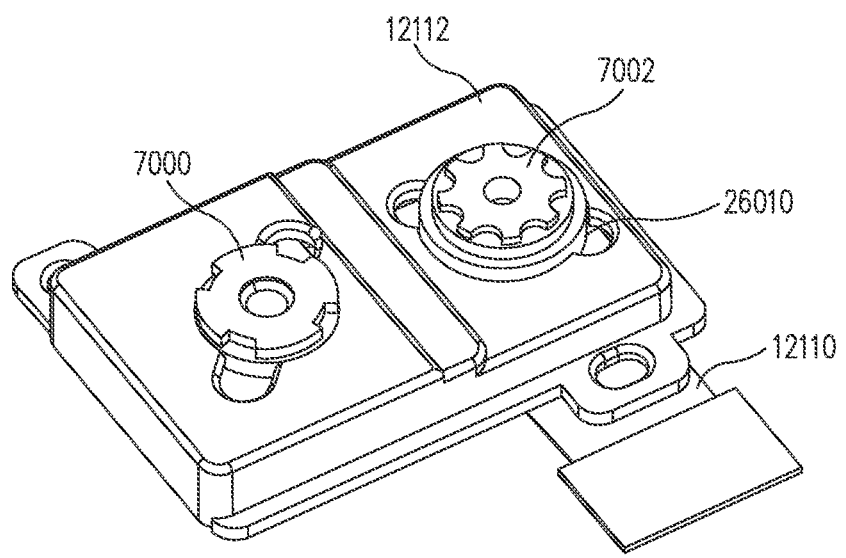
FIG. 27 illustrates a front perspective view of a bridge having an infrared imaging module and a non-thermal imaging module mounted in the bridge and showing how adhesive may be used to fix the infrared imaging module and the non-thermal imaging module in the bridge in accordance with an embodiment of the disclosure.

FIG. 27 illustrates a front perspective view of a bridge 12112 having an infrared imaging module 7000 and a non-thermal imaging module 7002 mounted in the bridge 12112 and showing how adhesive may be used to fix the infrared imaging module 7000 and the non-thermal imaging module 7002 in the bridge 12112 in accordance with an embodiment of the disclosure.

Figure 28:
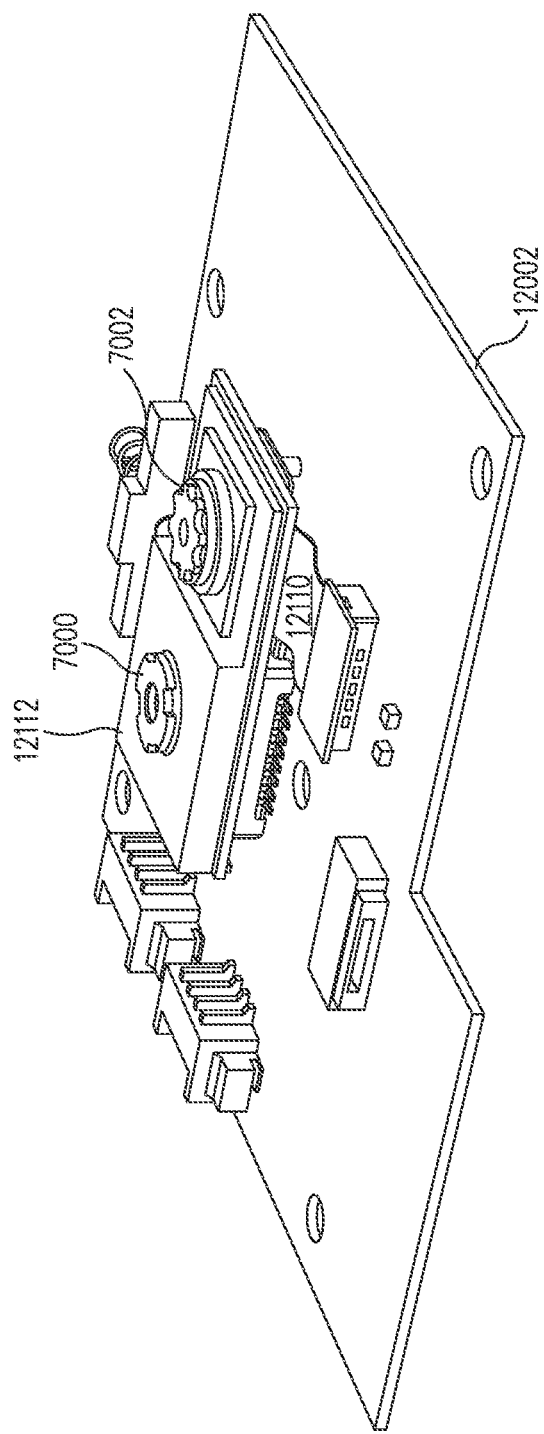
FIG. 28 illustrates a perspective view of an infrared imaging module and a non-thermal imaging module mounted to a printed circuit board of a device attachment using a bridge and showing how the infrared imaging module may be attached to the printed circuit board and the non-thermal imaging module may be attached to the infrared imaging module by the bridge in accordance with an embodiment of the disclosure.

FIG. 28 illustrates a perspective view of an infrared imaging module 7000 and a non-thermal imaging module 7002 mounted to a camera module circuit board 12002 of a device attachment using a bridge 12112 and showing how the infrared imaging module 7000 may be attached to the camera module circuit board 12002 and the non-thermal imaging module 7002 may be attached to the infrared imaging module 7000 by the bridge 12112 in accordance with an embodiment of the disclosure.

Figure 29:
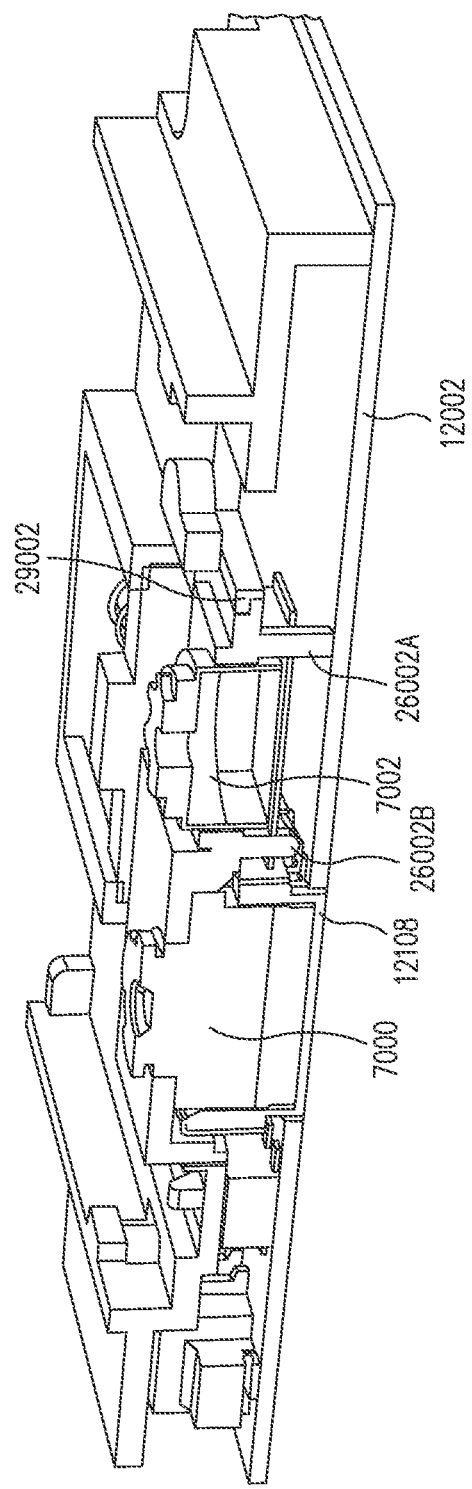
FIG. 29 illustrates a cross-sectional perspective view of the assembly of FIG. A3 showing how the infrared imaging module may be mounted in a socket on the printed circuit board and showing how a fixturing post on the non-thermal imaging module may pass through an opening the bridge to contact the printed circuit board, thereby providing support for the non-thermal imaging module in accordance with an embodiment of the disclosure.

FIG. 29 illustrates a cross-sectional perspective view of the assembly of FIG. 28 showing how the infrared imaging module 7000 may be mounted in a socket 12108 on the camera module circuit board 12002 and showing how a fixturing post 26002A on the non-thermal imaging module 7002 may pass through an opening the bridge 12112 to contact the camera module circuit board 12002, thereby providing support for the non-thermal imaging module 7002 in accordance with an embodiment of the disclosure. In one embodiment, an engagement surface 29002 (e.g., a key or feature) may be provided on a bottom edge of the bridge 12112 and configured to lock against the non-thermal imaging module 7002 to provide further support in a different direction (e.g., a substantially opposite direction) that the support provided by the fixturing post 26002A and camera module circuit board 12002.

Figure 30:
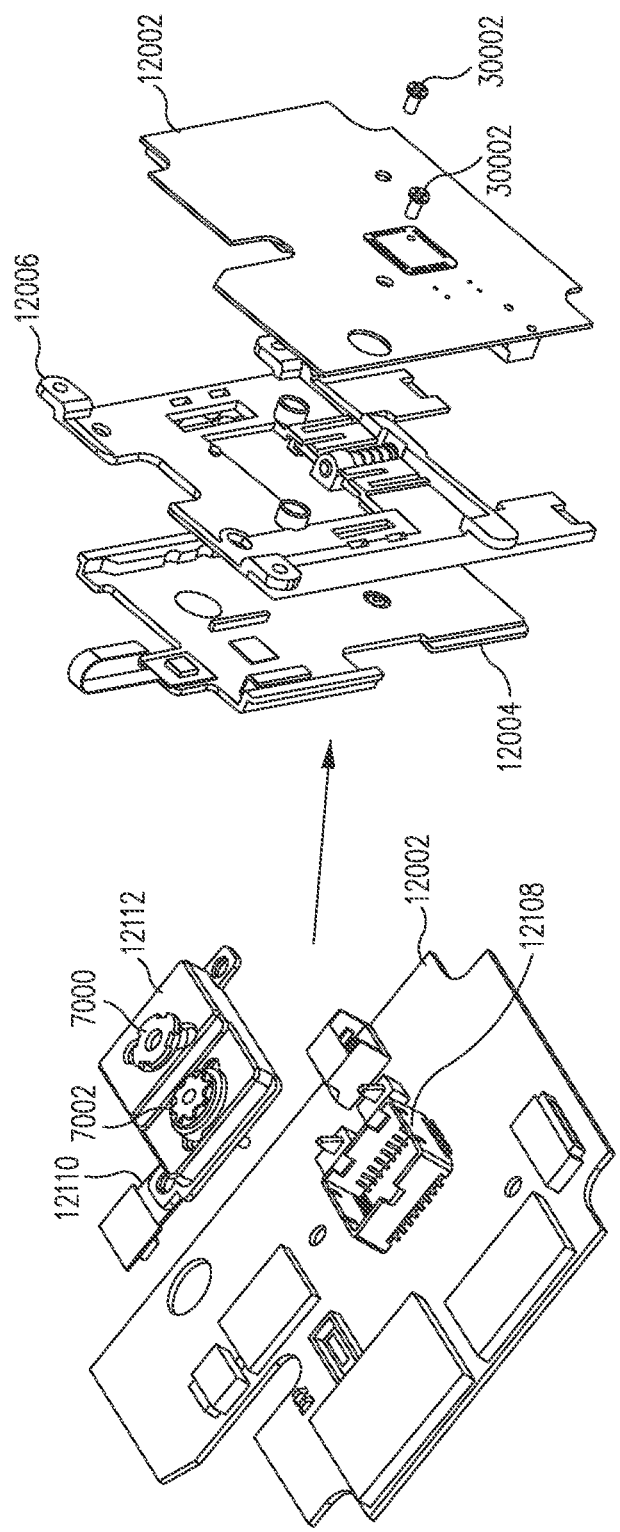
FIG. 30 illustrates an exploded perspective view of components of a device attachment including a printed circuit board with a socket for receiving an infrared imaging module, a bridge assembly having an infrared imaging module and a non-thermal imaging module mounted in a bridge, and a slider assembly and showing how the printed circuit board may be attached to a module case to provide a clamping force on the bridge assembly for holding the bridge assembly in place in accordance with an embodiment of the disclosure.

FIG. 30 illustrates an exploded perspective view of components of a device attachment 1250 including a camera module circuit board 12002 with a socket 12108 for receiving an infrared imaging module 7000, a bridge assembly having an infrared imaging module 7000 and a non-thermal imaging module 7002 mounted in a bridge 12112, and a slider assembly 12004 and showing how the camera module circuit board 12002 may be attached to a module frame 12006 to provide a clamping force on the bridge assembly for holding the bridge assembly in place in accordance with an embodiment of the disclosure. In one example, the module frame 12006 and the camera module circuit board 12002 may be configured to clamp the bridge assembly when the camera module circuit board 12002 is fastened to the module frame 12006 by one or more fasteners 30002 (e.g., screws).

Therefore, for example, bridge 12112 according to one or more embodiments may beneficially permit accurate, repeatable, and stable alignment between multiple imaging modules such as infrared imaging module 7000 and non-thermal imaging module 7002, by utilizing a single high-precision part (e.g., bridge 12112) that is integrated into lower tolerance assemblies (e.g., a camera module circuit board 12002, a slider assembly 12004, a module frame 12006 and/or other parts where fit and cosmetic aspects are more relevant than precision). As such, utilizing bridge 12112 in implementing device attachment 1250 may also beneficially permit a compact packaging while reducing production cost.

In some embodiments, device attachment 1250 implemented according to various techniques described above may be utilized to provide calibrated temperature information (e.g., radiometric data) of an object (e.g., by capturing one or more calibrated thermal images and determining from the intensity and/or spectrum of the object in the thermal images, the temperature of the object as would be understood by one skilled in the art). The accuracy of this type of image-based temperature measurement can be improved by ensuring that the thermal imaging module has been recently calibrated when an image-based temperature measurement is to be made. In some embodiments, various operations may be performed by device attachment 1250 and/or user device 1200 to ensure that the thermal imaging module has been recently calibrated when an image-based temperature measurement is to be made, for example according to various techniques described in U.S. Provisional Application No. 61/923,732 filed Jan. 5, 2014 and entitled "DEVICE ATTACHMENT WITH DUAL BAND IMAGING SENSOR", which is incorporated herein by reference.

Embodiments described above illustrate but do not limit the invention. It should also be understood that numerous modifications and variations are possible in accordance with the principles of the invention. Accordingly, the scope of the invention is defined only by the following claims.

While various embodiments illustrated herein are described in relation to a device attachment, it should be understood that one or more embodiments of the invention are applicable also to the device solely or in conjunction with the device attachment. For example, the thermal image sensor may be implemented directly into the device (e.g., device 1200) and also optionally the additional non-thermal image sensor may be implemented within the device. Consequently, the principles taught herein may be applied based on the sensors implemented within the device.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A device, comprising:
    a thermal imaging module having a first side and a second side opposite the first side;
    a non-thermal imaging module;
    a circuit board, wherein the thermal imaging module is disposed such that the first side is within a socket secured to the circuit board; and
    a bridge coupled to and extending between the thermal imaging module and the non-thermal imaging module, wherein the bridge comprises at least one fixturing element that engages a portion of the non-thermal imaging module and contacts a surface of the circuit board to support the non-thermal imaging module, wherein the bridge is coupled to the second side and configured to maintain a position of the thermal imaging module relative to the non-thermal imaging module to maintain alignment between the thermal imaging module and the non-thermal imaging module.

2. The device of claim 1, wherein the bridge is disposed above the circuit board and is configured to maintain the position of the thermal imaging module relative to the non-thermal imaging module for spatially referenced X, Y, rotation, and tilt positions.

3. The device of claim 1, wherein the socket mechanically and electrically couples the thermal imaging module to the circuit board.

4. The device of claim 3, wherein the non-thermal imaging module is electrically coupled to the circuit board by a flexible circuit and wherein the at least one fixturing element comprises at least one fixturing post that extends through the portion of the non-thermal imaging module to the surface of the circuit board to support the non-thermal imaging module.

5. The device of claim 4, wherein:
    the bridge includes first and second openings in which the thermal imaging module and the non-thermal imaging module are respectively disposed;
    a first surface of the second opening bears against a surface of the non-thermal imaging module to prevent translational motion of the non-thermal imaging module within the bridge;
    a top interior surface of the bridge engages the non-thermal imaging module to maintain a relative tilt of the non-thermal imaging module; and
    the at least one fixturing post comprises at least two fixturing posts that engage corresponding openings on the non-thermal imaging module to maintain a relative rotational offset of the thermal imaging module and the non-thermal imaging module.

6. A method of assembling the device of claim 1, the method comprising:
    providing the thermal imaging module;
    securing the thermal imaging module to the circuit board;
    providing the non-thermal imaging module; and
    coupling the thermal imaging module to the non-thermal imaging module by the bridge.

7. The method of claim 6, wherein:
    the coupling comprises controlling, by the bridge, a position of the thermal imaging module relative to the non-thermal imaging module for spatially referenced X, Y, rotation, and tilt positions;
    the at least one fixturing element comprises at least one fixturing post;
    the securing the thermal imaging module comprises mechanically and electrically coupling the thermal imaging module to the circuit board by inserting the thermal imaging module into the socket secured to the circuit board; and the providing the non-thermal imaging module comprises:
electrically coupling the non-thermal imaging module to the circuit board by connecting the non-thermal imaging module to the circuit board by a flexible circuit, wherein the non-thermal imaging module is coupled to the circuit board only via the bridge and the flexible circuit; and
inserting the at least one fixturing post through the portion of the non-thermal imaging module to the surface of the circuit board to support the non-thermal imaging module.

8. The method of claim 7, wherein the providing the thermal imaging module further comprises disposing the thermal imaging module in a first opening of the bridge, and wherein the providing the non-thermal imaging module further comprises:
placing a first surface of a second opening of the bridge against a surface of the non-thermal imaging module to prevent translational motion of the non-thermal imaging module within the bridge;
placing a top interior surface of the bridge against the non-thermal imaging module to maintain a relative tilt of the non-thermal imaging module; and
wherein the inserting the at least one fixturing post through the portion of the non-thermal imaging module comprises inserting at least two fixturing posts into corresponding openings on the non-thermal imaging module to maintain a relative rotational offset of the thermal imaging module and the non-thermal imaging module.

9. A device, comprising:
a thermal imaging module comprising an infrared sensor assembly; and
a switch assembly comprising a slider plate and a slider button provided on the slider plate, wherein the switch assembly is configured to switch on and off the device and further configured to control the slider plate configured to block external infrared energy from being received by the infrared sensor assembly, wherein, via movement of the slider button, the switch assembly comprises:
a first switch position that positions the slider plate to switch off the device;
a second switch position that positions the slider plate to switch on the device; and
a third switch position that positions at least a portion of the slider plate to block the external infrared energy from being received by the infrared sensor assembly while the device is switched on.

10. The device of claim 9, wherein the slider plate is configured to be:
moved to the first switch position to contact neither a first switch nor a second switch;
moved to the second switch position to contact the first switch and not the second switch; and
moved to the third switch position to contact both the first switch and the second switch and block the external infrared energy from being received by the thermal imaging module while the device is switched on.

11. The device of claim 9, wherein the third switch position controls the thermal imaging module to perform a calibration operation and further positions the slider plate to provide a uniform scene for the thermal imaging module.

12. The device of claim 11, further comprising:
a temperature measurement device to provide a temperature measurement of the slider plate for the calibration operation; and
at least one molded interconnect trace that thermally couples the slider plate to the temperature measurement device to provide the temperature measurement of the slider plate.

13. A method, comprising:
providing a thermal imaging module comprising an infrared sensor assembly; and
providing a switch assembly comprising a slider plate and a slider button provided on the slider plate, wherein the switch assembly is configured to switch on and off the thermal imaging module and further configured to control the slider plate to selectively block external infrared energy from being received by the infrared sensor assembly, wherein, via movement of the slider button, the switch assembly comprises:
a first switch position that positions the slider plate to switch off a device that includes the thermal imaging module;
a second switch position that positions the slider plate to switch on the device; and
a third switch position that positions at least a portion of the slider plate to block the external infrared energy from being received by the infrared sensor assembly while the device is switched on.

14. The method of claim 13, wherein the slider plate is configured to be:
moved to the first switch position to contact neither a first switch nor a second switch;
moved to the second switch position to contact the first switch and not the second switch; and
moved to the third switch position to contact both the first switch and the second switch and block the external infrared energy from being received by the thermal imaging module while the device is switched on.

15. The method of claim 14, further comprising providing a temperature measurement device in thermal contact with the slider plate to provide a temperature measurement of the slider plate for a calibration operation, wherein the providing the temperature measurement device comprises thermally coupling the slider plate to the temperature measurement device using at least one molded interconnect trace, and wherein the third switch position controls the thermal imaging module to perform the calibration operation and further positions the slider plate to provide a uniform scene for the thermal imaging module.

16. The device of claim 1, further comprising a switch assembly comprising a slider plate, wherein the switch assembly is configured to:
switch on or off the device; and
control the slider plate to selectively block, using the slider plate, external infrared energy from being received by the thermal imaging module.

17. The device of claim 9, further comprising:
a non-thermal imaging module;
a circuit board, wherein the thermal imaging module is coupled to the circuit board; and
a bridge coupled to and extending between the thermal imaging module and the non-thermal imaging module, wherein the bridge is configured to substantially maintain a position of the thermal imaging module relative to the non-thermal imaging module to maintain alignment between the thermal imaging module and the non-thermal imaging module, wherein the switch assembly further comprises an insulator provided on a portion of the slider plate, and wherein the slider button is provided on the insulator.

18. The method of claim 13, wherein movement of the slider button causes movement of first and second openings of the slider plate relative to the thermal imaging module and a non-thermal imaging module, and wherein the first opening is associated with the thermal imaging module and the second opening is associated with the non-thermal imaging module.

19. The device of claim 1, wherein the at least one fixturing element comprises a first fixturing post and a second fixturing post longer than the first fixturing post, and wherein the second fixturing post extends through the portion of the non-thermal imaging module to the surface of the circuit board to support the non-thermal imaging module.

20. The device of claim 1, wherein:
the bridge includes a first opening and a second opening;
the thermal imaging module is disposed in the first opening;
the non-thermal imaging module is disposed in the second opening;
an inner circumference of the first opening engages an outer circumference of a lens barrel of the thermal imaging module; and
an inner circumference of the second opening engages an outer circumference of a lens barrel of the non-thermal imaging module.

* * * * *